United States Patent
Yokoyama

(10) Patent No.: US 8,683,235 B2
(45) Date of Patent: Mar. 25, 2014

(54) ELECTRICAL APPARATUS

(75) Inventor: Jun Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 553 days.

(21) Appl. No.: 12/891,919

(22) Filed: Sep. 28, 2010

(65) Prior Publication Data

US 2011/0252247 A1    Oct. 13, 2011

(30) Foreign Application Priority Data

Apr. 13, 2010  (JP) ................. 2010-091955

(51) Int. Cl.
*G06F 1/26* (2006.01)
*G06F 1/32* (2006.01)

(52) U.S. Cl.
USPC ........... 713/300; 713/320; 713/323; 713/330; 713/340

(58) Field of Classification Search
USPC .................. 713/300, 320, 323, 330, 340
See application file for complete search history.

(56) References Cited

U.S. PATENT DOCUMENTS

| | | | |
|---|---|---|---|
| 5,910,750 A | 6/1999 | Harada et al. | |
| 6,470,290 B1 | 10/2002 | Lee et al. | |
| 2011/0252247 A1* | 10/2011 | Yokoyama | 713/300 |

FOREIGN PATENT DOCUMENTS

| | | |
|---|---|---|
| DE | 19944053 A1 | 4/2001 |
| JP | 2002369407 A | 12/2002 |
| JP | 2003150281 A | 5/2003 |
| JP | 2004341592 A | 12/2004 |
| JP | 2006230147 A | 8/2006 |

OTHER PUBLICATIONS

Computer Translation for JP 2002-269407 printed Dec. 1, 2012.*
Japanese Office Action for JP2010-091955 issued Jan. 24, 2012.
Japanese Office Action for JP2010-091955 issued Sep. 6, 2011.
German Office Action for DE102010042030.1 dated Sep. 25, 2012.

* cited by examiner

*Primary Examiner* — Tanh Nguyen

(74) *Attorney, Agent, or Firm* — Sughrue Mion, PLLC

(57) ABSTRACT

An electrical apparatus includes a main unit which consumes electrical power; a power supply unit which supplies electrical power from a commercial power source to the main unit; a secondary battery to be charged with electrical power supplied from the power supply unit; and a power source control unit. In a state where a power source of the main unit is the power supply unit, when power consumption of the main unit exceeds a first threshold, the power source control unit changes the state to another state where the power source of the main unit is the power supply unit and secondary battery.

12 Claims, 15 Drawing Sheets

ELECTRICAL APPARATUS

INCORPORATION BY REFERENCE

This application is based upon and claims the benefit of priority from Japanese patent application No. 2010-091955, filed on Apr. 13, 2010, the disclosure of which is incorporated herein in its entirety by reference.

TECHNICAL FIELD

The present invention relates to an electrical apparatus using a commercial power source and a secondary battery as power sources.

BACKGROUND ART

Electrical apparatuses operable by means of a commercial power source have a power supply unit for supplying electrical power from the commercial power source to the inside of the apparatus. Further, some electrical apparatuses have a secondary battery which is charged by electrical power supplied from a power supply unit and supplies electrical power to the inside of the apparatus.

Japanese Unexamined Patent Publication No. 2003-150281 (Patent Document 1) discloses an example of an electrical apparatus having a power supply unit and a secondary battery. In the electrical apparatus of Patent Document 1, by optimizing power consumption of the power supply unit and the secondary battery, reduction of power supply from the power supply unit is realized in a time period of large power demand (for example, for three hours from 1. p.m. to 4 p.m.). Specifically, Patent Document 1 shows a computer device as an example of an electrical apparatus, and describes that the computer device performs control as shown below.

The computer device is constituted of some sub systems including a CPU, a hard disk, and an inverter. At the start time of a peak power reduction time period (for example, 1 p.m.), the entire sub systems constituting the computer device transit to a first stage where electrical power is supplied from the secondary battery. Then, a retaining time of the secondary battery is calculated from the discharging current value of the secondary battery and the remaining capacity of the secondary battery, and it is determined whether or not the secondary battery is retainable until the end time of the peak power reduction time period. If the secondary battery is retainable, the first stage is maintained, but if not, the stage moves to the next stage, that is, a second stage.

In the second state, the power source of any of the sub systems (for example, inverter) is changed from the secondary battery to the power supply unit so as to reduce the discharging current value of the secondary battery. Then, a retaining time of the secondary battery is calculated from the discharging current value of the secondary battery and the remaining capacity of the secondary battery, and it is determined whether or not the secondary battery is retainable until the end time of the peak power reduction time period. If the secondary battery is retainable, the second stage is maintained, but if not, the stage moves to the next stage, that is, a third stage.

In the third state, the mode of the CPU is changed to a low-speed mode so as to further reduce the discharging current value of the secondary battery. Then, a retaining time of the secondary battery is calculated from the discharging current value of the secondary battery and the remaining capacity of the secondary battery, and it is determined whether or not the secondary battery is retainable until the end time of the peak power reduction time period. If the secondary battery is retainable, the third stage is maintained, but if not, the stage moves to the next stage, that is, a fourth stage.

In the fourth stage, the power source of the CPU is changed from the secondary battery to the power supply unit so as to further reduce the discharging current value of the secondary battery. At the same time, the mode of the CPU is returned to the normal mode from the low-speed mode. Then, a retaining time of the secondary battery is calculated from the discharging current value of the secondary battery and the remaining capacity of the secondary battery, and it is determined whether or not the secondary battery is retainable until the end time of the peak power reduction time period. If the secondary battery is retainable, the third stage is maintained, but if not, the stage moves to the next stage, that is, a fifth stage (final stage).

In the fifth stage, the power sources of the entire sub systems of the computer are changed to the power supply unit.

As another art related to the present invention, Japanese Unexamined Patent Publication No. 2006-230147 (Patent Document 2) discloses a power receiving system. The power receiving system is a system for controlling electrical power of the entire facility of a factory or a household having various electrical apparatuses such as lightings, air conditioners, and electronics devices. The system includes an AC power storage means, a switching means for switching between the AC power storage means and a commercial power, and a control device which detects received power energy and controls the switching means. The power receiving system uses only commercial power as a power source when the entire load on the facility does not exceed the contracted power energy, and when the received power of the facility is about to exceed the contracted power energy, the system supplies the deficient power energy of the received power with respect to the load, from the AC power storage means. Thereby, the power energy received from the commercial power source is suppressed to the contracted power energy or less. Further, when the peak power consumption time period has been passed and the entire load remains within the contracted power energy, power is supplied to the entire load on the facility while charging the AC power storage means by the received power. With this configuration, as there is no power consumption due to discharging from the AC power storage means in a time period other than the peak power consumption time period, the AC power storage means can be charged for peak power consumption of the next day.

Patent Document 1: JP 2003-150281 A
Patent Document 2: JP. 2006-230147 A

The electrical apparatus of Patent Document 1 is directed to reducing received power consumption in a time period of large power demand (for example, three hours from 1:00 p.m. to 3:00 p.m.). However, the invention of Patent Document 1 includes a fifth stage at which the electrical power for all of the subsystems of the computer are solely supplied from the power supply unit and the CPU is operated in a normal mode, and fails to have a system for suppressing the received power consumption in a time period other than the above-described tome zone. As such, the power supply unit is required to have a capacity capable of supplying power for the maximum power consumption of the entire electrical apparatus by itself.

Meanwhile, the power receiving system of Patent Document 2 is configured such that when it is detected that received power is about to exceeding the contract power, deficiency in the received power with respect to the load on the facility is supplied from the AC power storage means. As such, the power energy of the entire facility, received from the commercial power source, can be suppressed to the contracted power or less. However, there is no system for suppressing received power of each electrical apparatus in the facility to be a certain value or less. As such, the power supply unit in each of the electrical apparatuses is naturally required to have a capacity capable of supplying power for maximum power consumption of the electrical apparatus by itself.

In general, a power supply unit becomes larger as the maximum power supply capacity becomes higher, and also, the price becomes higher. Further, in a power supply unit, conversion efficiency of the power source deteriorates in an environment where the required capacity is significantly lower than its maximum power supply capacity. Generally, in an electrical apparatus, a time period in which it operates at maximum power consumption is not so long, and is typically operates in a state where power consumption is significantly lower than the maximum power consumption. As such, the power supply unit, capable of sufficiently covering the maximum power consumption of the electrical apparatus, operates in a state where the power efficiency is wrong for a long period in the operating time.

SUMMARY

An exemplary object of the present invention is to provide an electrical apparatus, capable of solving the above-described problem, that is, an electrical apparatus requires a power supply unit having a capacity capable of covering maximum power consumption of the apparatus by itself, which is large and expensive has low conversion efficiency in a normal state.

An electrical apparatus, according to an exemplary aspect of the invention, includes a main unit which consumes electrical power; a power supply unit which supplies electrical power from a commercial power source to the main unit; a secondary battery to be charged with the electrical power supplied from the power supply unit; and a power source control unit which, in a state where a power source of the main unit is the power supply unit, when power consumption of the main unit exceeds a first threshold, changes the state to another state where the power source of the main unit is the power supply unit and secondary battery.

An IT device, according to another exemplary aspect of the invention, includes main components including a CPU which consumes electrical power, and a memory; a power supply unit which supplies electrical power from a commercial power source to the main component; a secondary battery to be charged with the electrical power supplied from the power supply unit; and a power source control unit which, in a state where a power source of the main components is the power supply unit, when power consumption of the main component exceeds a first threshold, changes the state to another state where the power source of the main components is the power supply unit and secondary battery.

A power source control device, according to another exemplary aspect of the invention, includes an interface for transmitting a switching signal to a first switch which controls whether or not to supply electrical power from a power supply unit to a main unit, a second switch which controls whether or not to supply electrical power for charging from the power supply unit to a secondary battery, and a third switch which controls whether or not to supply electrical power from the secondary battery to the main unit; and a control unit which, in a state where the first switch is on so that a power source of the main unit is the power supply unit, when power consumption of the main unit exceeds a first threshold, turns on the first switch and the third switch so as to change the state to another state where the power source of the main unit is the power supply unit and the secondary battery.

A power source controlling method, according to another exemplary aspect of the invention, is performed by an electrical apparatus including a main unit which consumes electrical power, a power supply unit which supplies electrical power from a commercial power source to the main unit, and a secondary battery to be charged with the electrical power supplied from the power supply unit. The method includes, in a state where a power source of the main unit is the power supply unit, when power consumption of the main unit exceeds a first threshold, changing the state to another state where the power source of the main unit is the power supply unit and secondary battery.

A computer program product, according to another exemplary aspect of the invention, includes computer implementable instructions. The program causes a computer, including an interface for transmitting a switching signal to a first switch connected to a power supply channel from a power supply unit to a main unit, a second switch connected to a charging power supply channel from the power supply unit to a secondary battery, and a third switch connected to a power supply channel from the secondary battery to the main unit, to function as a control unit which in a state where the first switch is on so that a power source of the main unit is the power supply unit, when power consumption of the main unit exceeds a first threshold, turns on the first switch and the third switch so as to change the state to another state where the power source of the main unit is the power supply unit and the secondary battery.

As the present invention is configured as described above, it is possible to use a power supply unit which is smaller and less expensive than a power supply unit for supplying maximum power consumption of the entire electrical apparatus and having low conversion efficiency in a general state.

EXEMPLARY EMBODIMENT

Next, exemplary embodiments of the present invention will be described in detail with reference to the drawings.

First Exemplary Embodiment

Figure 1:
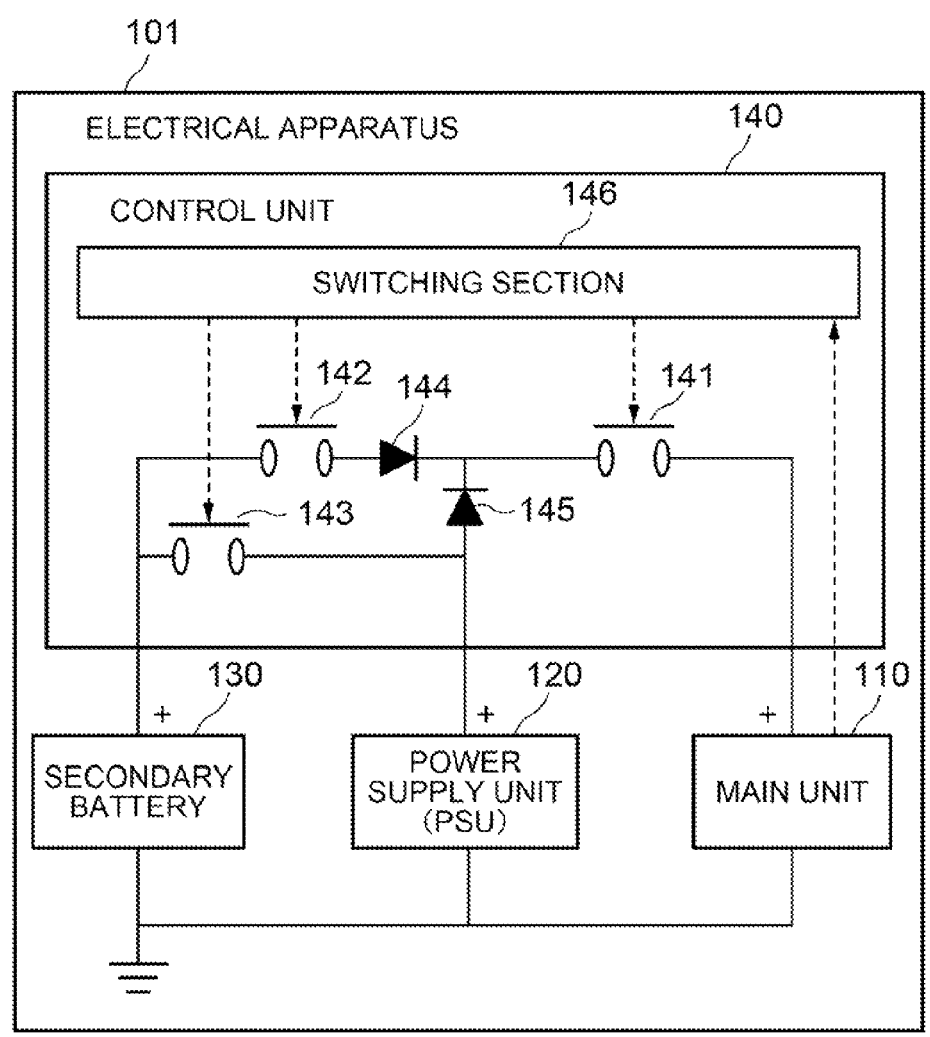
FIG. 1 is a block diagram showing a first exemplary embodiment of the present invention.

Referring to FIG. 1, an electrical apparatus 101 according to a first exemplary embodiment of the present invention includes a main unit 110 which consumes electrical power, a power supply unit (PSU) 120 which supplies electrical power received from a commercial power source to the main unit 110 and a secondary battery 130, a secondary battery 130 which is charged with power supplied from the power supply unit 120 and supplies charged power to the main unit 110, and a control unit 140 which controls switching between the power sources of the main unit 110.

In the case where the electrical apparatus 110 is a computer device, the main unit 110 includes a CPU, a memory, a hard disk device, a display device, and the like. The main unit 110 may also have a function of notifying the control unit 140 of power consumption Pt of the main unit 110 or operating information of the main unit for calculating the power consumption Pt.

The secondary battery 130 is formed of a lithium ion battery, for example. An output voltage of the secondary battery 130 is almost the same as an output voltage of the power supply unit 120.

The power supply unit 120 converts AC power received from a commercial power source through a power supply line, not shown, into DC power of a predetermined voltage, and supplies it to the inside of the apparatus.

The control unit 140 operates with power supplied from the power supply unit 120. The control unit 140 has a function of selecting the power source of the main unit 110 from the power supply unit 120 and the secondary battery 130. The control unit 140 also has a function of comparing threshold power Pb which is set to be the same value as maximum power consumption Pmax of the main unit 110 or a smaller value, with power consumption Pt of the main unit 110, and monitoring whether or not the power consumption Pt of the main unit 110 exceeds the threshold power Pb. Further, in a state where the power source of the main unit 110 is only the power supply unit 120, the control unit 140 also has a function of switching the power source of the main unit 110 to the power supply unit 120 and the secondary battery 130 if the power consumption Pt of the main unit 110 exceeds the threshold power Pb.

An exemplary configuration of the control unit 140 having the above functions is described in the block diagram of FIG. 1. The control unit 140 of this example includes, a series circuit constituted of a switch 142, a diode 144, and a switch 141 and connected between the positive terminal of the secondary battery 130 and the positive terminal of the main unit 110; a switch 143 connected between the positive terminal of the secondary battery 130 and the positive terminal of the power supply unit 120; and a switching section 146. The diode 144 is adapted such that an anode thereof is connected to the switch 142 and a cathode thereof is connected to the switch 141. Further, the anode of the diode 144 is connected to a cathode of another diode 145, and an anode of the diode 145 is connected to the positive terminal of the power supply unit 120. While the diodes 144 and 145 are provided to prevent current flow from a higher voltage side to a lower voltage side of the power supply unit 120 and the secondary battery 130, these components may be omitted. The switches 141 to 143 are controlled to be on or off by a switching control signal output from the switching section 146. Further, the main unit 110 is adapted to notify the switching section 146 of power consumption Pt of the main unit 110 or operating information of the main unit for calculating the power consumption Pt.

Next, operation of the present embodiment will be described.

As an initial state, it is assumed that the electrical apparatus 101 is in a state where the power source of the main unit 110 is only the power supply unit 120, and that the secondary battery 130 is fully charged. In this state, the switch 141 is on, and the switches 142 and 143 are off.

In this state, the switching section 146 of the control unit 140 detects power consumption Pt of the main unit 110, and compares the power consumption Pt with threshold power Pb. Then, when the switching section 146 detects that the power consumption Pt of the main unit 110 exceeds the threshold power Pb, the switching section 146 turns on the switch 142. Thereby, in addition to power supplied from the power supply unit 120 to the main unit 110 via the diode 145 and the switch 141, power is also supplied from the secondary battery 130 to the main unit 110 via the switch 142, the diode 144, and the switch 141. As such, even if it is impossible to supply power of the threshold power Pb or higher to the main unit 110 because of low power supply capacity of the power supply unit 120, the shortfall can be supplied from the secondary battery 130.

Figure 2:
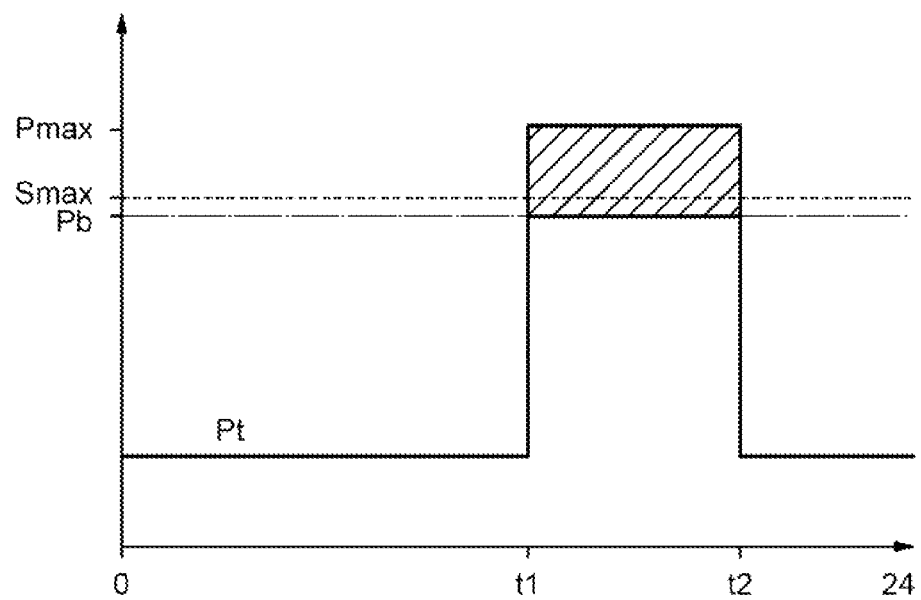
FIG. 2 is a graph showing exemplary transitions, in a day, of maximum power consumption Pmax of a main unit, maximum available power supply Smax of a power supply unit, threshold power Pb, and power consumption Pt of the main unit, in the first exemplary embodiment of the present invention.

FIG. 2 is a graph showing exemplary transitions, in a day, of maximum power consumption Pmax of the main unit 110, maximum available power supply Smax of the power supply unit 120, the threshold power Pb, and the power consumption Pt of the main unit 110. As shown in FIG. 2, the maximum available power supply Smax of the power supply unit 120 is less than the maximum power consumption Pmax of the main unit 110. Further, the threshold power Pb is set to be almost the same as the maximum available power supply Smax or a value smaller by a certain margin than the maximum available power supply Smax. In a time period from time 0 to time t1 in which the power consumption Pt of the main unit 110 is smaller than the threshold power Pb, power is only supplied from the power supply unit 120 to the main unit 110. Then at time t1, when the power consumption Pt of the main unit 110 exceeds the threshold power Pb, power is supplied from both the power supply unit 120 and the secondary battery 130 to the main unit 110. This state is maintained until time t2 at which the power consumption Pt of the main unit 110 becomes smaller than the threshold power Pb. Then, when the power consumption Pt of the main unit 110 becomes smaller than the threshold power Pb at the time t2, power is supplied only from the power supply unit 120 to the main unit 110. In FIG. 2, the hatched portion indicates the power energy supplied from the secondary battery 130 to the main unit 110 because the power consumption Pt of the main unit 110 exceeds the maximum available power supply Smax of the power supply unit 120.

As described above, according to the present embodiment, in a state where the power source of the main unit 110 is only the power supply unit 120, when the power consumption of the main unit 110 exceeds the threshold power Pb, the state transits to a state where the power source of the main unit 110 is the power supply unit 120 and the secondary battery 130. As such, as it is not necessary to cover the maximum power consumption of the main unit 110 solely by the power supply unit 120, it is possible to use a power supply unit which is smaller, less expensive, and having better conversion efficiency at the time of normal operation as the power supply unit 120, compared with a power supply unit capable of covering maximum power consumption of the entire electrical apparatus 101.

Second Exemplary Embodiment

Figure 3:
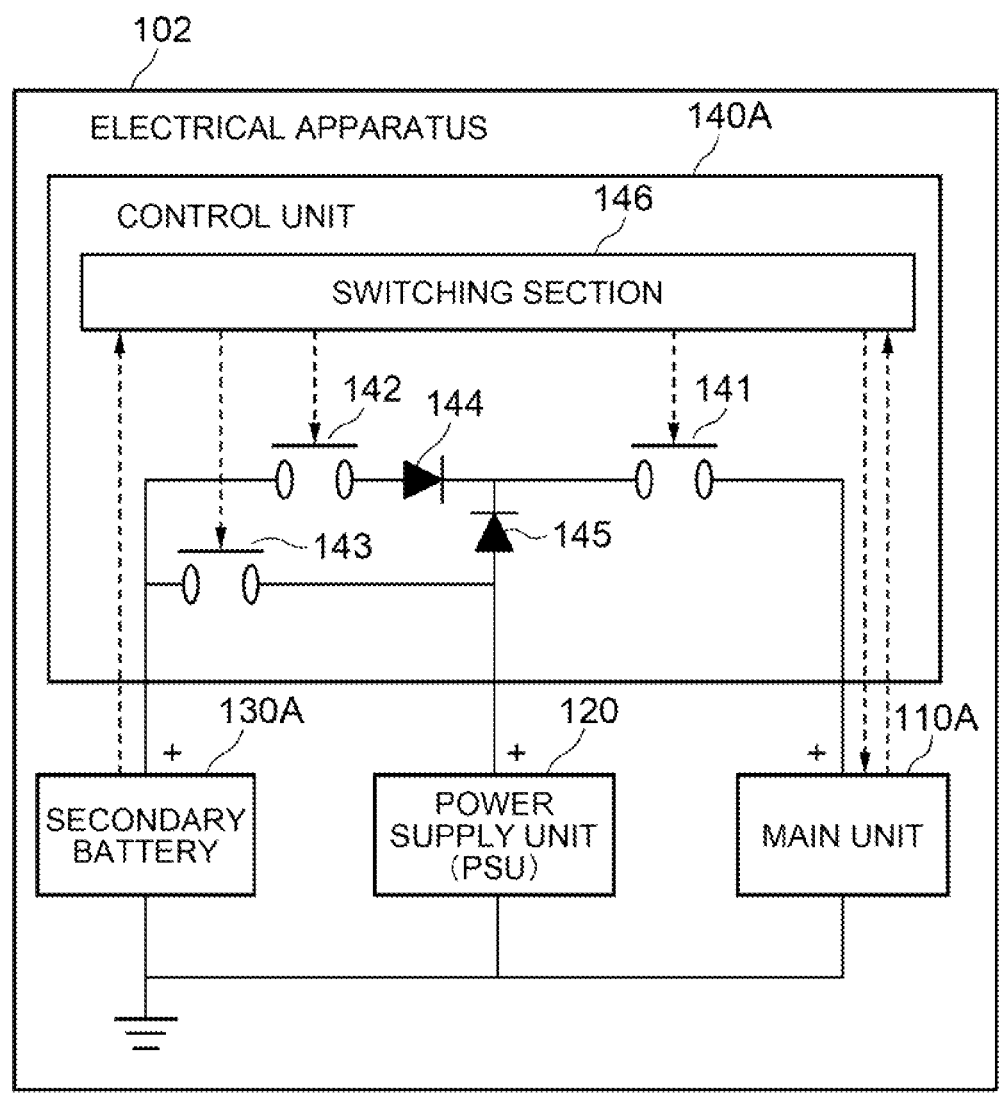
FIG. 3 is a block diagram showing a second exemplary embodiment of the present invention.

Referring to FIG. 3, an electrical apparatus 102 according to a second exemplary embodiment of the present invention differs from the electrical apparatus 101 of the first exemplary embodiment shown in FIG. 1 in that the electrical apparatus 102 includes a main unit 110A, a secondary battery 130A, and a control unit 140A, instead of the main unit 110, the secondary battery 130, and the control unit 140. The other components are the same as those of the electrical apparatus 101.

Compared with the main unit 110, the main unit 110A differs in being capable of switching operation from normal operation to low power consuming operation in which power consumption is lower than that of the normal operation, or from low power consuming operation to normal operation. The other aspects are the same as those of the main unit 110. The function of operating at low power consuming operation, in which power consumption is lower than that of the normal operation, is called power capping function or power cap.

Compared with the secondary battery 130, the secondary battery 130A differs in having a function of notifying the control unit 140A of the remaining capacity, while the other aspects are the same as those of the secondary battery 130.

The control unit 140A has a function of selecting a power source of the main unit 110A from the power supply unit 120 and the secondary battery 130A, and a function of comparing threshold power Pb which is set to be almost the same as the maximum power consumption of the main unit 110A or a smaller value with the power consumption of the main unit 110A, and monitoring whether or not the power consumption of the main unit 110A exceeds the threshold power Pb. Also, the control unit 140A has a function of detecting remaining capacity of the secondary battery 130A, and a function of charging the secondary battery 130A with power supplied from the power supply unit 120. Further, in a state where the power source of the main unit 110A is only the power supply unit 120, if the power consumption of the main unit 110A exceeds the threshold power Pb, the control unit 140A has a function of changing the power source of the main unit 110A to both the power supply unit 120 and the secondary battery 130 if the remaining capacity of the secondary battery 130A exceeds a predetermined threshold Bmin, whereas if the remaining capacity of the secondary battery 130 is not more than the threshold Bmin, switching the operation of the main unit 110A to low power consuming operation.

An exemplary configuration of the control unit 140A having the above functions is described in the block diagram of FIG. 3. In addition to the same configuration of that of the control unit 140 shown in FIG. 1, the control unit 140A of this example is adapted such that a control signal, for switching operation of the main unit 110A from normal operation to low power consuming operation, or from low power consuming operation to normal operation, is output from the switching section 146 to the main unit 110A. Further, it is also adapted that the remaining capacity is notified from the secondary battery 130A to the switching section 146.

Next, operation of the present embodiment will be described.

As an initial state, it is assumed that the electrical apparatus 102 is in a state where the power source of the main unit 110A is only the power supply unit 120, and that the secondary battery 130A is fully charged. In this state, the switch 141 is on, and the switches 142 and 143 are off.

In this state, the switching section 146 of the control unit 140A detects power consumption Pt of the main unit 110A, and compares it with the threshold power Pb. When the switching section 146 detects that the power consumption Pt of the main unit 110A exceeds the threshold power Pb, the switching section 146 determines whether or not the remaining capacity of the secondary battery 130A exceeds the threshold Bmin. If the remaining capacity of the secondary battery 130A exceeds the threshold Bmin, the switching section 146 turns on the switch 142. Thereby, in addition to power supplied from the power supply unit 120 to the main unit 110A via the diode 145 and the switch 141, power is also supplied from the secondary battery 130A to the main unit 110A via the switch 142, the diode 144, and the switch 141. On the other hand, if the remaining capacity of the secondary battery 130 is not more than the threshold Bmin, the switching section 146 switches the operation of the main unit 110A to low power consuming operation.

Figure 4:
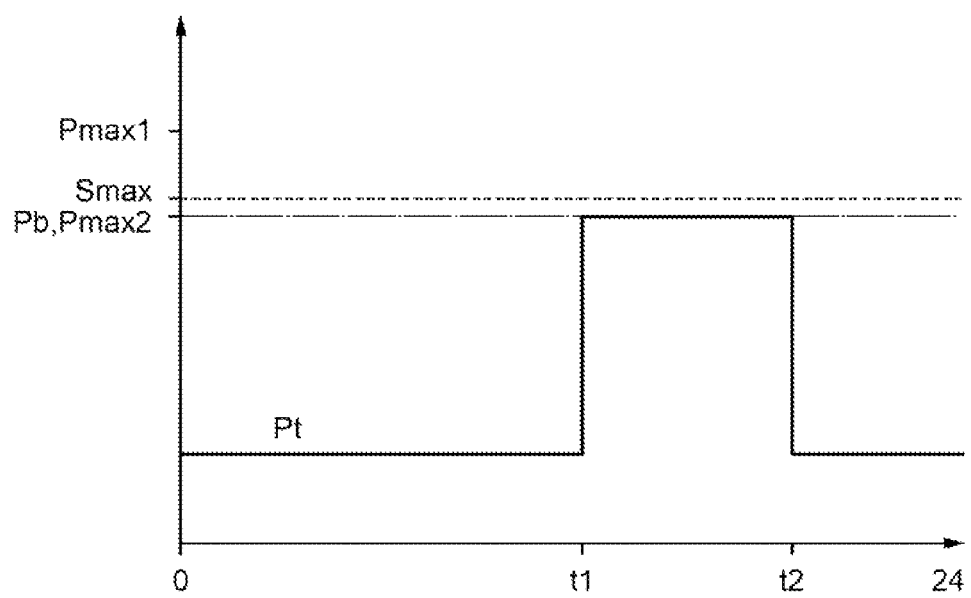
FIG. 4 is a graph showing exemplary transitions of maximum power consumption Pmax1 in a normal operation of a main unit, maximum power consumption Pmax2 in a low power consuming operation, maximum available power supply Smax of a power supply unit, threshold power Pb, and power consumption Pt of the main unit, in the second exemplary embodiment of the present invention.

FIG. 4 is a graph showing exemplary transitions of maximum power consumption Pmax1 of the main unit 110A, maximum power consumption Pmax2 at the time of low power consuming operation of the main unit 110A, maximum available power supply Smax of the power supply unit 120, the threshold power Pb, and the power consumption Pt of the main unit 110A. In this example, the maximum power consumption Pmax2 at the time of low power consuming operation of the main unit 110A is set to be almost the same as the maximum available power supply Smax of the power supply unit 120 or smaller by a certain margin than the maximum available power supply Smax. In a time period from time 0 to time t1 in which the power consumption Pt of the main unit 110A is smaller than the threshold power Pb, power is supplied only from the power supply unit 120 to the main unit 110A. Then at time t1, when the power consumption Pt of the main unit 110A exceeds the threshold power Pb, an assist from the secondary battery 130A is attempted. However, if the remaining capacity of the secondary battery 130A is insufficient (if the remaining capacity of the secondary battery 130 is not more than the threshold Bmin), an assist by the secondary battery 130A is not performed, and instead, the operation of the main unit 110A is switched from normal operation to low power consuming operation. Thereby, the power consumption Pt of the main unit 110A is prevented from exceeding the maximum available power supply Smax of the power supply unit 120. Then, after time t2, when the power consumption Pt of the main unit 110A becomes smaller by a predetermined value than the threshold power Pb, the operation of the main unit 110A again is switched to the normal operation.

On the other hand, if the remaining capacity of the secondary battery 130A exceeds the threshold Bmin at the time t1, the same operation as that shown in FIG. 2 of the first exemplary embodiment will be taken.

As described above, according to the present embodiment, in a state where the power source of the main unit 110A is only the power supply unit 120, when the power consumption of the main unit 110A exceeds the threshold power Pb, the remaining capacity of the secondary battery 130A is checked, and if the remaining capacity is sufficient, the state transits to a state where the power source of the main unit 110A is the power supply unit 120 and the secondary battery 130A. As such, as it is not necessary to cover the maximum power consumption of the main unit 110A only by the power supply unit 120, it is possible to use a power supply unit which is smaller, less expensive, and having better conversion efficiency at the time of normal operation as the power supply unit 120, compared with a power supply unit capable of covering maximum power consumption of the entire electrical apparatus 102 by itself.

Further, according to the present embodiment, in a state where the power source of the main unit 110A is only the power supply unit 120, when the power consumption of the main unit 110A exceeds the threshold power Pb, the remaining capacity of the secondary battery 130A is checked, and if the remaining capacity is insufficient, the operation of the main unit 110A is switched from the normal operation to the low power consuming operation. As such, it is possible to prevent a condition in which normal operation of the main unit 110A is continued in a state where the remaining capacity of the secondary battery 130A is insufficient so that the power consumption of the main unit 110A exceeds the power level available solely by the power supply unit 120 and the operation of the main unit 110A becomes unstable consequently.

Third Exemplary Embodiment

Figure 5:
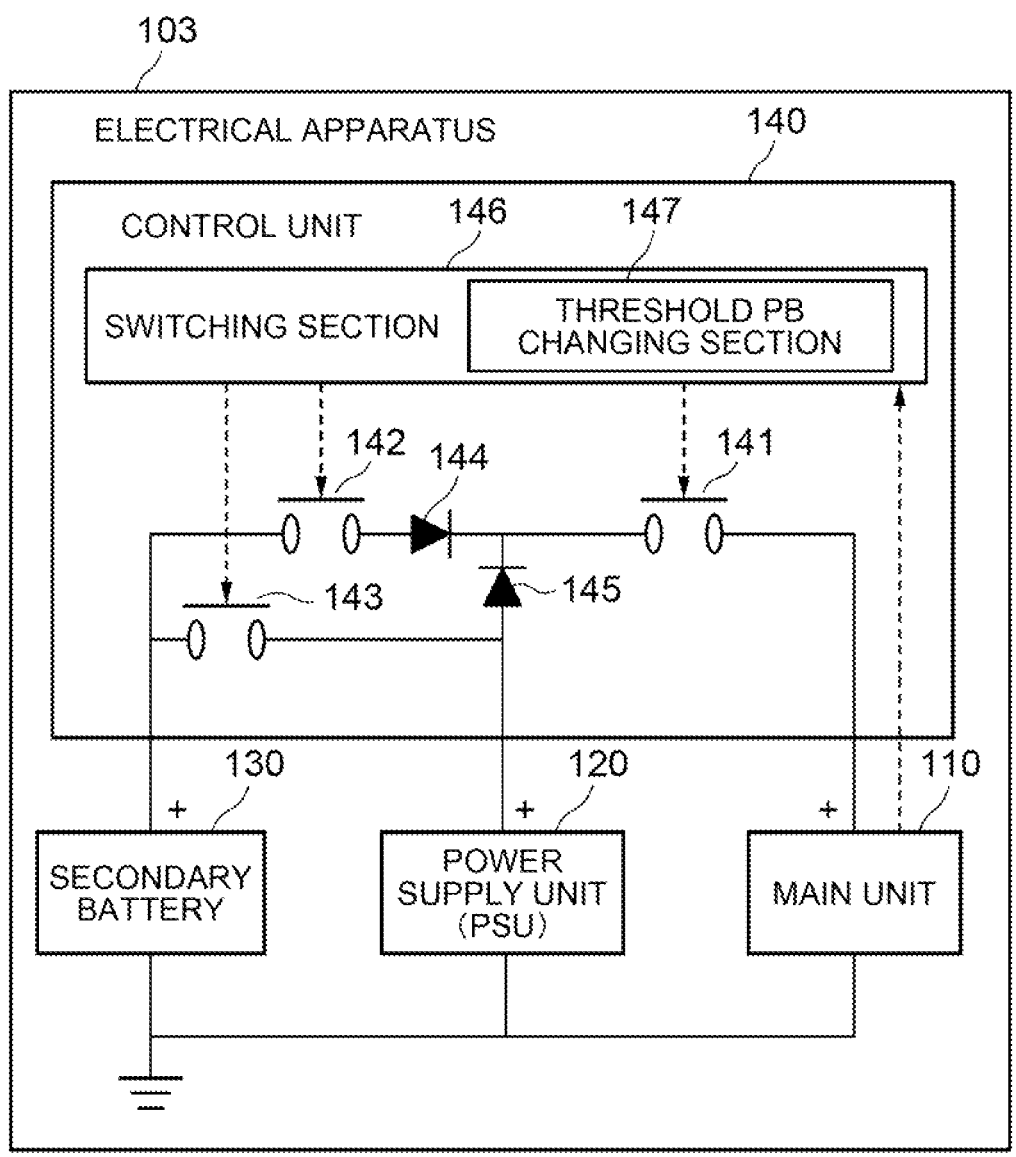
FIG. 5 is a block diagram showing a third exemplary embodiment of the present invention.

Referring to FIG. 5, an electrical apparatus 103 according to a third exemplary embodiment of the present invention differs from the electrical apparatus 101 of the first exemplary embodiment shown in FIG. 1 in that the control unit 140 includes a threshold Pb changing section 147. The other components are the same as those of the electrical apparatus 101.

The threshold Pb changing section 147 has a function of changing threshold power Pb for starting an assist by the secondary battery 130 depending on date, time, and/or a day of the week. More specifically, the threshold Pb changing section 147 changes the threshold power Pb to a smaller value at a peak power consumption time period (for example, 1:00 p.m. to 4:00 p.m.) in summer such that an assist by the secondary battery 130 is performed when the power consumption Pt by the main unit 110 is smaller. Further, the threshold Pb changing section 147 may raise the threshold power Pb in a time period in which power demand is not tight such as a night time so as not to start an assist by the secondary battery 130. However, the threshold Pb should be set not to exceed the maximum available power supply Smax of the power supply unit 120.

Figure 6:
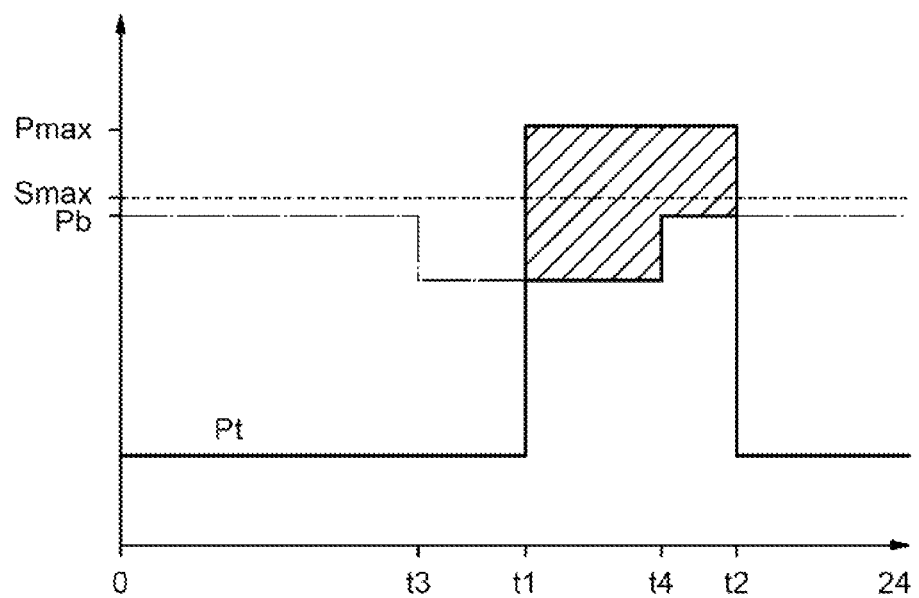
FIG. 6 is a graph showing exemplary transitions, in a day, of maximum power consumption Pmax of a main unit, maximum available power supply Smax of a power supply unit, threshold power Pb, and power consumption Pt of the main unit, in the third exemplary embodiment of the present invention.

FIG. 6 is a graph showing exemplary transitions, in a day, of maximum power consumption Pmax of the main unit 110, maximum available power supply Smax of the power supply unit 120, the threshold power Pb, and the power consumption Pt of the main unit 110. In this example, in a time period from time t0 to time t3 and a time period from time t4 to time t24, the threshold power Pb it set to be almost the same as the maximum available power supply Smax or a value smaller by a certain margin than the maximum available power supply Smax, while in a time period from time t3 to time t4, the threshold power Pb is set to be a smaller value than that in other time periods. In the time period from the time t0 to the time t1 in which the power consumption Pt of the main unit 110 is smaller than the threshold power Pb, power is supplied to the main unit 110 only from the power supply unit 120. Then, when the power consumption Pt of the main unit 110 exceeds the threshold power Pb at the time t1, power is supplied to the main unit 110 from both the power supply unit 120 and the secondary battery 130. This state is maintained until the time t2 when the power consumption Pt of the main unit 110 becomes smaller than the threshold power Pb. Then, when the power consumption Pt of the main unit 110 becomes smaller than the threshold power Pb at the time t2, power is supplied to the main unit 110 only from the power supply unit 120. The hatched portion in FIG. 6 corresponds to the power energy supplied from the secondary battery 130 to the main unit 110. As the threshold Pb is lowered in the time period from the time t3 to the time t4, although the power energy assisted by the secondary battery 130 is increased compared with FIG. 2 of the first exemplary embodiment, the received power energy in the time period from the time t1 to the time t4 is reduced.

As described above, according to the present embodiment, an advantageous effect similar to that of the first exemplary embodiment can be achieved, and also, received power energy in a particular time period such as a peak power consumption time period in summer can be suppressed.

Fourth Exemplary Embodiment

Figure 7:
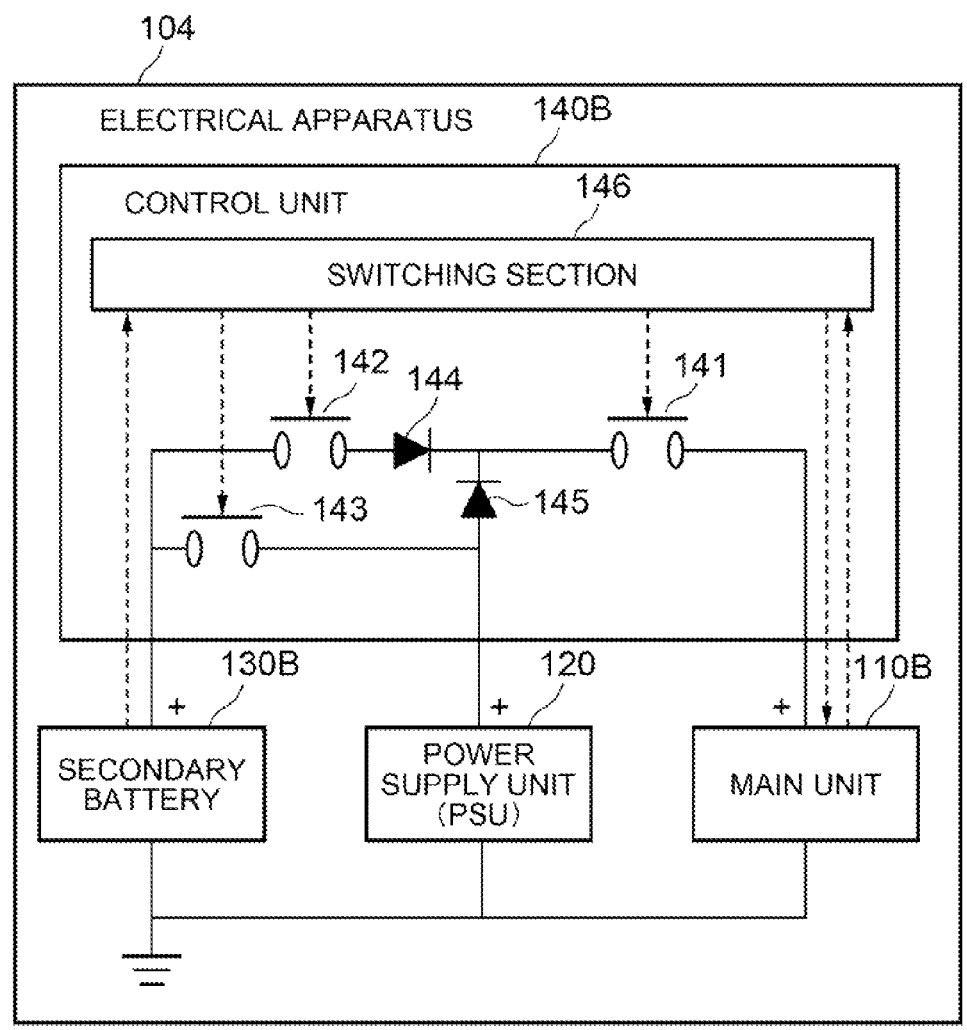
FIG. 7 is a block diagram showing a fourth exemplary embodiment of the present invention.

Referring to FIG. 7, an electrical apparatus 104 according to a fourth exemplary embodiment of the present invention differs from the electrical apparatus 101 of the first exemplary embodiment shown in FIG. 1 in that the electrical apparatus 104 includes a main unit 110B, a secondary battery 130B, and a control unit 140B, instead of the main unit 110, the secondary battery 130, and the control unit 140. The other components are the same as those of the electrical apparatus 101.

Compared with the main unit 110, the main unit 110B differs in being capable of switching operation from normal operation to low power consuming operation in which power consumption is lower than that of the normal operation, or from low power consuming operation to normal operation. The other aspects are the same as those of the main unit 110.

Compared with the secondary battery 130, the secondary battery 130B differs in having a function of notifying the control unit 140B of the remaining capacity, while the other aspects are the same as those of the secondary battery 130.

The control unit 140B has a function of selecting the power source of the main unit 110B from the power supply unit 120 and the secondary battery 130B, and a function of comparing threshold power Pb which is set to be almost the same as the maximum power consumption of the main unit 110B or a smaller value with the power consumption of the main unit 110B, and monitoring whether or not the power consumption of the main unit 110B exceeds the threshold power Pb. Also, the control unit 140B has a function of detecting remaining capacity of the secondary battery 130B, and a function of charging the secondary battery 130B with power supplied from the power supply unit 120.

Further, the control unit 140B has a function of storing a time period in which the power consumption of the main unit 110B reaches a peak, and schedules charging of the secondary battery 130B such that the secondary battery 130B has been charged completely by the start time of that time period. Further, if the secondary battery 130B is being charged by the power from the power supply unit 120 in a time period other than the time period in which the power consumption of the main unit 110B becomes maximum, when the power consumption of the main unit 110B exceeds the upper limit for securing the charged power, the control unit 140B has a function of switching the operation of the main unit 110B to low power consuming operation. The control unit 140B also has a function of switching the operation of the main unit 110B to low power consuming operation in a time period other than the time period in which the power consumption of the main unit 110B becomes maximum, and initiating charging of the secondary battery 130B with power from the power supply unit 120.

An exemplary configuration of the control unit 140B having the above functions is described in the block diagram of FIG. 7. In addition to the configuration of the control unit 140 shown in FIG. 1, the control unit 140B of this example is adapted such that a control signal, for switching operation of the main unit 110B from normal operation to low power consuming operation, or from low power consuming operation to normal operation, is output from the switching section 146 to the main unit 110B. Further, it is also adapted that the remaining capacity is notified from the secondary battery 130B to the switching section 146.

Next, operation of the present embodiment will be described.

As an initial state, it is assumed that the electrical apparatus 104 is in a state where the power source of the main unit 110B is only the power supply unit 120, and that the secondary battery 130B is fully charged. In this state, the switch 141 is on, and the switches 142 and 143 are off.

In this state, when the peak power consumption time period of the main unit 110B has come and the switching section 146 of the control unit 140B detects that the power consumption of the main unit 110B has exceeded the threshold power Pb, the switching section 146 turns on the switch 142. Thereby, in addition to power supplied from the power supply unit 120 to the main unit 110B via the diode 145 and the switch 141, power is also supplied from the secondary battery 130B to the main unit 110B via the switch 142, the diode 144, and the switch 141. As such, even if it is impossible to supply power exceeding the threshold power Pb to the main unit 110B because of low power supply capacity of the power supply unit 120, the shortfall can be supplied from the secondary battery 130B.

When the peak power consumption time period of the main unit 110B has elapsed and the switching section 146 of the control unit 140B detects that the power consumption of the main unit 110 becomes the threshold power Pb or lower, the switching section 146 turns off the switch 142. Thereby, the assist provided by the secondary battery 130B is stopped, and power is supplied to the main unit 110B only from the power supply unit 120.

When the peak power consumption time period has elapsed, the switching section 146 of the control unit 140B performs scheduling for charging the secondary battery 130B such that the secondary battery 130B becomes fully charged by the start time of the next peak power consumption time period of the main unit 110B. Specifically, the switching section 146 periodically performs operations of checking the remaining capacity of the secondary battery 130B, calculating a charging time required for completing charging based on the remaining capacity while considering some extra time, comparing the calculated charging time with the remaining time from the current time to the next peak power consumption time period, and determining whether or not the charging time becomes less than the remaining time.

Then, when the switching section 146 determines that the charging time becomes less than the remaining time, the switching section 146 turns on the switch 143 to start charring of the secondary battery 130B. During charging of the secondary battery 130B, the switching section 146 determines whether or not the power consumption of the main unit 110B exceeds a threshold defining the upper limit for securing charging power. If the power consumption of the main unit 110B exceeds the upper limit threshold during charging of the secondary battery 130B, the switching section 146 switches the operation of the main unit 110B to low power consuming operation in order to secure charging power. Alternatively, the switching section 146 switches the operation of the main unit 110B to low power consuming operation when it determines that the charging time becomes less than the remaining time, and turns on the switch 143 to start charging of the secondary battery 130B.

Figure 8:
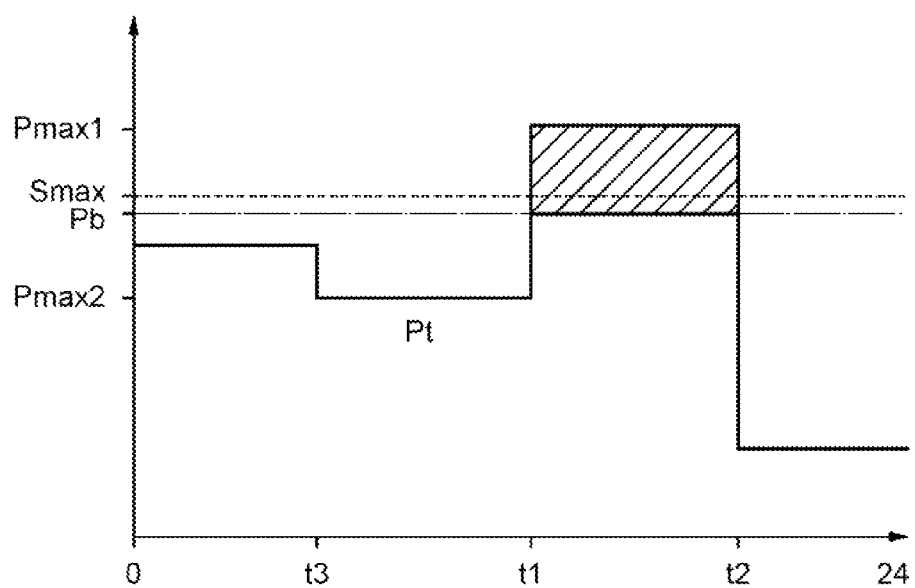
FIG. 8 is a graph showing exemplary transitions of maximum power consumption Pmax1 in a normal operation of a main unit, maximum power consumption Pmax2 in a low power consuming operation, maximum available power supply Smax of a power supply unit, threshold power Pb, and power consumption Pt of the main unit, in the fourth exemplary embodiment of the present invention.

FIG. 8 is a graph showing exemplary transitions of maximum power consumption Pmax1 of the main unit 110B, maximum power consumption Pmax2 at the time of low power consuming operation of the main unit 110B, maximum available power supply Smax of the power supply unit 120, the threshold power Pb, and the power consumption Pt of the main unit 110B. In this example, the maximum power consumption Pmax2 at the time of low power consuming operation of the main unit 110B is set to be smaller by power required for charging the secondary battery 130B, than the maximum available power supply Smax. In the time period from time 0 to time t3 in which the power consumption Pt of the main unit 110B is smaller than the threshold power Pb, power is supplied to the main unit 110B only from the power supply unit 120. Then, at the time t3, charging of the secondary battery 130B starts according to the charging schedule. At this time, as the power consumption Pt of the main unit 110B exceeds the upper limit threshold Pmax2, the switching section 146 switches the operation of the main unit 110B to low power consuming operation so as to secure charging power. Thereby, it is ensured that charging of the secondary battery 130B completes by the time t1 when the time period of peak power consumption Pt of the main unit 110B starts.

Then, at the time t1, when the power consumption Pt of the main unit 110B exceeds the threshold power Pb, power is supplied to the main unit 110B from both the power supply unit 120 and the secondary battery 130B, as in the first exemplary embodiment.

As described above, according to the present embodiment, an advantageous effect similar to that of the first exemplary embodiment can be achieved, and also, the secondary battery 130B can be charged by the time of starting the peak power consumption time period of the main unit 130B.

Fifth Exemplary Embodiment

Figure 9:
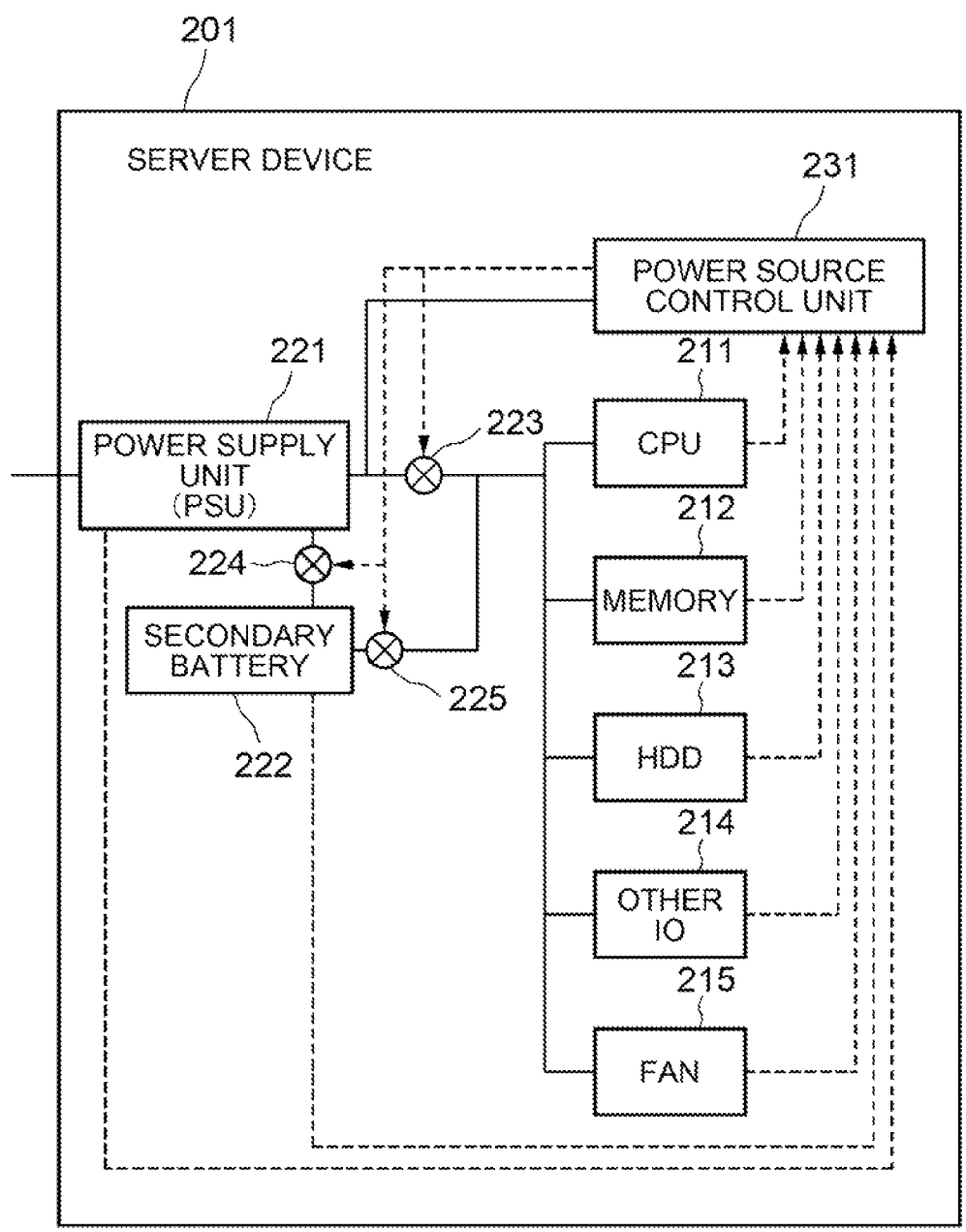
FIG. 9 is a block diagram showing a fifth exemplary embodiment of the present invention.

Next, an exemplary embodiment of applying the present invention to a server device, which is a type of computer device, will be described. Referring to FIG. 9, a server device 201 according to a fifth exemplary embodiment of the present invention includes server components such as a CPU 211, a memory 212, a HDD 213, another IO 214, and an electrical fan 215 for cooling, as main components. Further, the server device 201 includes a power source unit configured of a power supply unit 221, a secondary battery 222, and switches 223 to 225, and also includes a power source control unit 231 which controls the entire server.

The power supply unit 221 has a function of converting power input from an outside commercial power source into power usable in the server. The power output from the power supply unit 221 is supplied to server components such as the CPU 211 when the switch 223 is turned on, and supply of the power to the components is stopped when the switch 223 is turned off. Also, when the switch 224 is turned on, the power output from the power supply unit 221 is supplied to the secondary battery 222 as charging power, and when the switch 224 is turned off, supply of the charging power is stopped. Further, the power supply unit 221 always supplies power to the power source control unit 231. The power supply unit 221 has a function of notifying the power source control unit 231 of the received power energy measured by a built-in wattmeter.

The secondary battery 222 is formed of a lithium ion battery, for example. When the switch 224 is turned on, the secondary battery 222 is charged with power supplied from the power supply unit 221 via the switch 224. Further, the power accumulated in the secondary battery 222 is supplied to server components such as the CPU 211 when the switch 225 is turned on, and supply of the electrical power to those components is stopped when the switch 225 is turned off. The secondary battery 222 has a function of notifying the power source control unit 231 of the remaining capacity.

All or some of the server components such as the CPU 211 have a function of switching the operating state of themselves from normal operation to low power consuming operation, or from low power consuming operation to normal operation, in accordance with an instruction from the power source control unit 231. Server components including a CPU having such a function are called power adjustable components. Generally, as the CPU 211 and the memory 212 are adapted such that power consumption thereof is reduced when the operating frequency is lowered, the maximum power consumption can be adjusted in several stages by limiting the maximum operating frequency. Further, regarding the HDD 213 and the fan 215, power consumption can be reduced by decreasing the number of rotations of the disk and the fan.

The power source control unit 231 operates with power constantly supplied from the power supply unit 221, and has a function of controlling the entire server 201. The power source control unit 231 also has a function of periodically acquiring load information of the server components and estimating power consumption of the server components. Further, the power source control unit 231 has a function of summing the estimated power consumption of the server components so as to calculate the power consumption inside the server 201. Further, the power source control unit 231 has power capping controlling function for suppressing the upper limit of the power consumption inside the server to a certain value or lower, with use of the power adjustable components. Furthermore, the power source control unit 231 has a function of managing power of the server 201 with use of these functions.

Next, operation of the present embodiment will be described. First, operation of estimating power consumption inside the server, by the power source control unit 231, will be described.

The power source control unit 231 acquires load information from the server components such as the CPU at predetermined times, that is, at each predetermined cycle for example. The information which can be acquired directly from the hardware of the server components is acquired from the hardware, and information which must be acquired through an OS driver is acquired through the OS driver. The load information to be acquired includes load factor of the CPU, memory access frequency, HDD access frequency, and number of rotations of the fan, for example.

Figure 10:
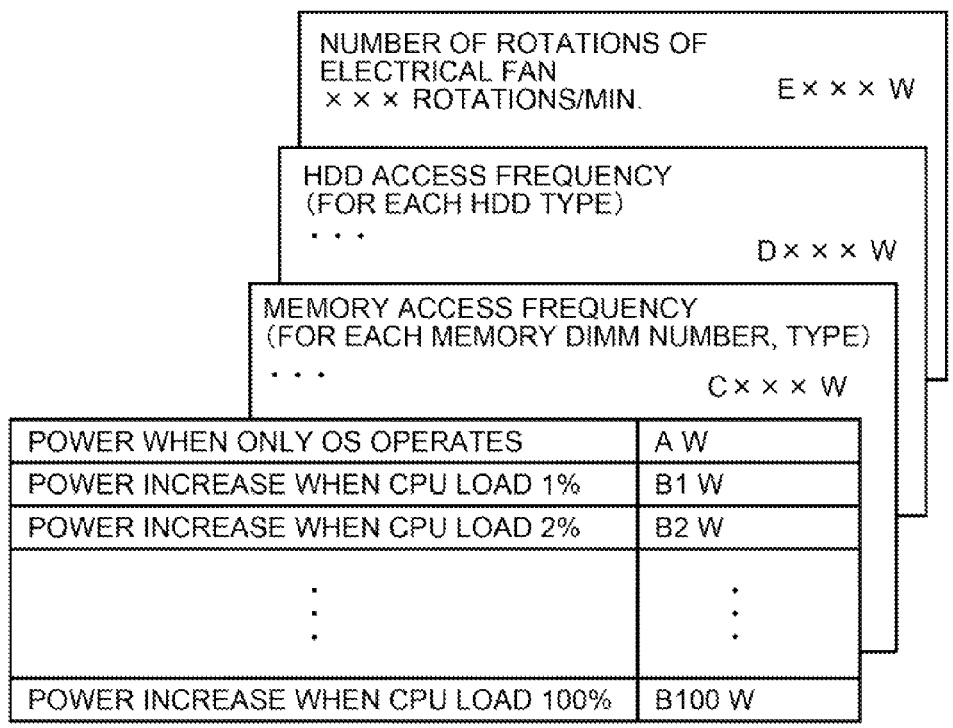
FIG. 10 shows an example of a power consumption estimation table used in the fifth exemplary embodiment of the present invention.

Then, the power source control unit 231 estimates power consumption for each of the server components based on the acquired load information. For example, the power source control unit 231 stores a power consumption estimation table as shown in FIG. 10. In the power consumption estimation table, power consumption of each load of each server component is set beforehand. For example, regarding the CPU, a power value in a state of only OS operation and power increases in the states of CPU load being 1 percent to 100 percents are stored. Regarding the memory, power values for respective memory access frequencies are stored for respective number of DIMM (Dual Inline Memory Modules) and the types. Regarding the HDD, power values of respective access frequencies are stored for respective types. Further, regarding the electric fan, power values are stored for respective number of rotations per minute. The power source control unit 231 acquires power consumption according to the acquired load, from the power consumption estimation table.

Then, the power source control unit 231 adds the estimated power consumption of the server components, and determines the total value to be an inner power consumption value of the server 201. The power source control unit 231 may determine the value calculated by adding the power consumption of the own power source control unit 231 to the total value, to be an inner power consumption value of the server 201. As the power consumption of the power source control unit 231 is slight, the value may be fixed beforehand, or presumed from the load value as in the cases of server components.

Although the inner power consumption of the server 201 is estimated from the loads of the server components in the present embodiment, an embodiment in which a wattmeter is provided in the section for supplying power to the inside of the server downstream of the switch 223 and the switch 225, and the power energy measured by the wattmeter is notified to the power source control unit 231, is also acceptable.

Next, the power capping controlling function of the power source control unit 231 will be described.

The power source control unit 231 realizes various types of power capping of different power consumption, depending on combinations of power adjustable components or various stages of power reduction rates even in the same combination of power adjustable components. Although any type of power capping can be used, the present embodiment uses two types of power cap, namely power cap A and power cap B having smaller maximum power consumption than that of power cap A. For example, if the maximum operating frequency of the CPU 211 is limited to 100M to realize the power cap A, for the power cap B, the maximum operating frequency of the CPU 211 is limited to 80M to further suppress the power consumption, whereby two types of power cap of different maximum power consumption can be realized.

Assuming that a maximum value of the inner power consumption of the server 201 is Pmax1, maximum power consumption in a state where the power cap A is set is Pmax2, and maximum power consumption in a state where the power cap B is set is Pmax3, a relationship of "Pmax1>Pmax2>Pmax3" is established. Further, assuming that maximum available power supply of the power supply unit 221 is Smax, the maximum power consumption value of the power cap A is set so as to establish a relationship of "Pmax1>Smax≥Pmax2" is established. As such, in the state of power cap A, the inner power consumption Pt of the server 201 is designed to be covered only by the power supply unit 221. Further, assuming that power Bj is consumed for charging the secondary battery 222, the maximum power consumption value of the power cap B is set so as to establish a relationship of "Smax≥Pmax3+Bj". As such, in the state of power cap B, the inner power consumption Pt of the server 201 is set to be not more than the power obtained by subtracting the charging power Bj of the secondary battery 222 from the maximum available power supply of the power supply unit 221.

Figure 11:
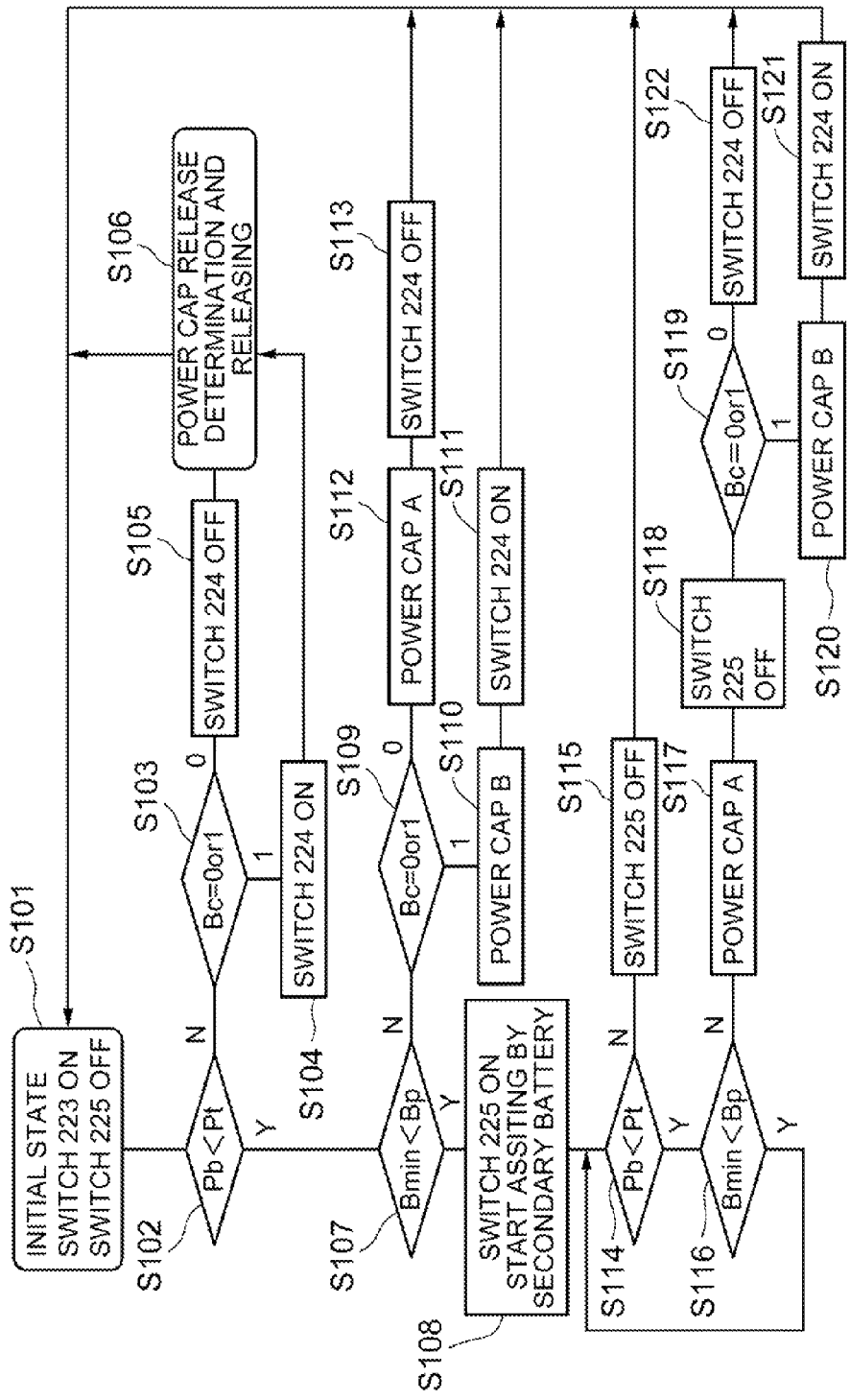
FIG. 11 is a flowchart showing operation of a power management function of the fifth exemplary embodiment of the present invention.

FIG. 11 is a flowchart showing operation of power management function of the power source control unit 231. Hereinafter, the operation of the power management function of the power source control unit 231 will be described with reference to FIG. 11.

The power source control unit 231 starts power management control in a state where the switch 223 is on, the switch 225 is off, and the switch 224 is on or off, that is, in an initial state where the power source to the server components is only the power supply unit 221 (S101). First, the power source control unit 231 compares the inner power consumption Pt with a threshold Pb for starting use of the secondary battery (S102). If the power consumption Pt does not exceed the threshold Pb (N at S102), the power source control unit 231 determines the state of a battery charging capability flag Bc (S103). It should be noted that the battery charging capability flag Bc is set to be 1 (chargeable) or 0 (dischargeable) by the power source control unit 231 performing the following process at predetermined cycles.

The power source control unit 231 first calculates an average value of the inner power consumption Pt. For the average value of the inner power consumption Pt, average power after the previous determination is used. However, an average of the inner power consumption Pt may be calculated by means of a method of calculating an average in a latest predetermined certain time period, a method of calculating average power in the same time period of the same day of the week, or method of using an average in a similar state period when a particular event was caused such as the last month, the same date of the last year, by the end of a month, or the like, or combinations thereof. Then, the power source control unit 231 compares a value obtained by adding a predetermined margin to the calculated inner power consumption Pt with the maximum power consumption Pmax3 of the power cap B. If the value obtained by adding the predetermined margin to the inner power consumption Pt is smaller than the maximum power consumption Pmax3, the power source control unit 231 sets "Bc=1" (chargeable), whereas if not, the power source control unit 231 sets "Bc=0" (dischargeable). However, if there is any particular condition such that electric rate is expensive in a particular time period or the like, the power source control sets "Bc=1" (dischargeable) in that time period.

As a result of determination at step S103, if the battery charging capability flag Bc=1 (chargeable), the power source control unit 231 turns on the switch 224 (S104), but turns off the switch 224 if the battery charging capability flag Bc=0 (S105). Then, the state is returned to the initial state via a power cap release determination and releasing step S106. The details of the power cap release determination and releasing step will be described below.

On the other hand, if the inner power consumption Pt exceeds the threshold Pb (Y at S102), the power source control unit 231 determines whether or not the remaining capacity Bp of the secondary battery 222 is sufficient by comparing the remaining capacity Bp and a lower limit value Bmin (S107). If the remaining capacity Bp of the secondary battery 222 exceeds the lower limit value Bmin (Y at S107), the power source control unit 231 turns on the switch 225 to start an assist for power supply by the secondary battery 222 (S108).

However, if the remaining capacity Bp of the secondary battery 222 is not more than the lower limit value Bmin, the power source control unit 231 abandons starting of an assist by the secondary battery 222, and instead, uses power cap to suppress the inner power consumption Pt of the server. Specifically, the power source control unit 231 determines the state of the battery charging capability flag Bc (S109), and if Bc is 1 (chargeable), sets the power cap B for securing charging power, and turns on the switch 224 (S111) to thereby allow the state to return to the initial state. On the other hand, if Bc is 0 (dischargeable), the power source control unit 231 sets the power cap A (S112) and turns on the switch 224 (S113) to thereby allow the state to return to the initial state.

During an assist performed by the secondary battery 222, the power source control unit 231 monitors whether or not the inner power consumption Pt is lowered to the secondary battery use starting threshold Pb or lower, and whether or not the remaining capacity Bp of the secondary battery 222 is lowered to the lower limit value Bmin or lower (S114, S116). However, if the inner power consumption Pt is lowered to the threshold Pb or lower, as an assist by the secondary battery 222 is not required any more, the power source control unit 231 turns off the switch 225 (S115) to allow the state to return to the initial state.

Further, if the inner power consumption Pt is not reduced to the threshold Pb or lower but the remaining capacity Bp of the secondary battery 222 is reduced to the lower limit value Bmin or less (N at S116), as it is impossible to continue assisting by the secondary battery 222, the power source control unit 231 sets the power cap A to reduce the inner power consumption Pt (S117), and turns off the switch 225 (S118). Then, the power source control unit 231 determines the state of the battery charging capability flag Bc (S119), and if Bc is 1 (chargeable), changes the power cap A to the power cap B in order to secure charging power (S120), and turns on the switch 224 (S121) so as to allow the state to return to the initial state. In contrast, if Bc is 0 (dischargeable), the power source control unit 231 maintains the power cap B and turns on the switch 224 (S122) to allow the state to return to the initial state.

Figure 12:
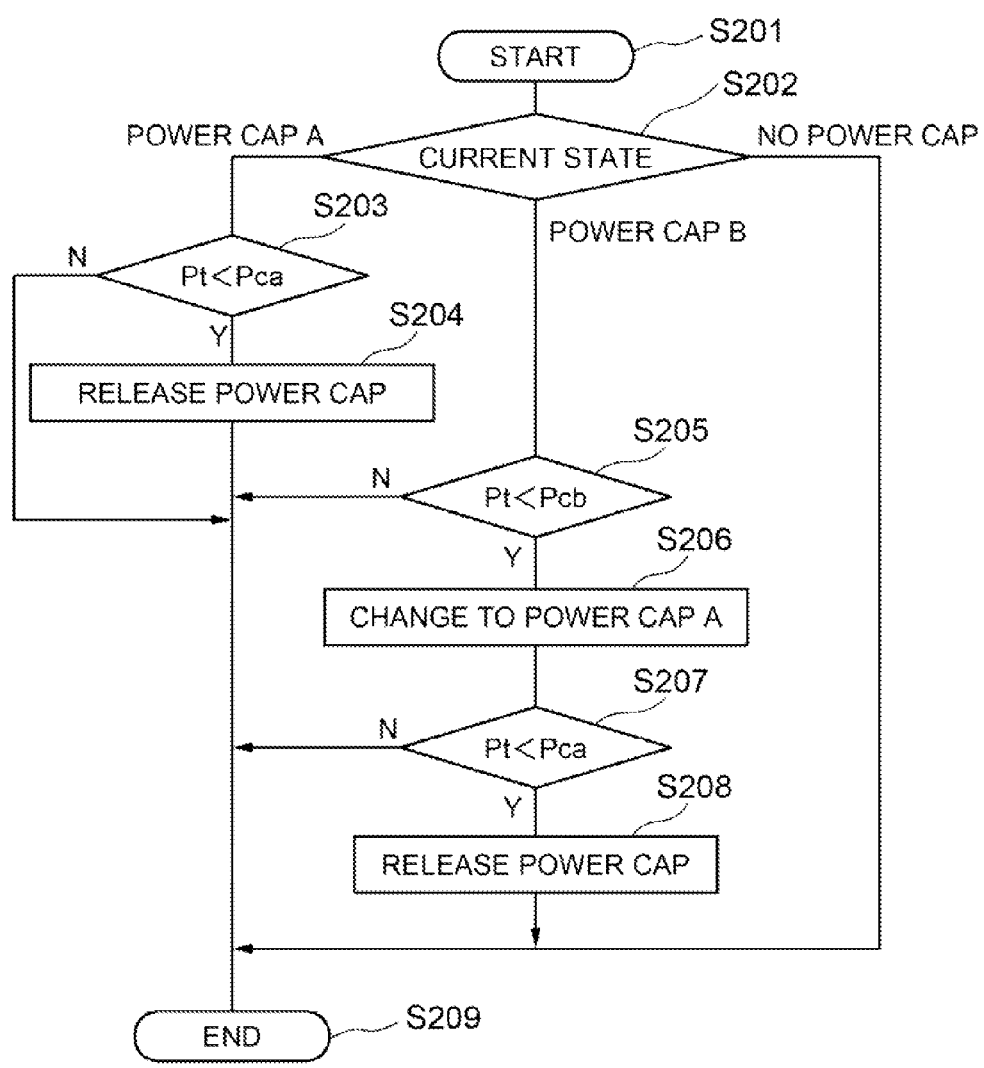
FIG. 12 is a flowchart showing an example of power cap release determination and releasing process in the fifth exemplary embodiment of the present invention.

Next, the power cap release determination and releasing process at step S106 in FIG. 11 will be described in detail with reference to the flowchart of FIG. 12. When the power source control unit 231 starts the power cap release determination and releasing process (S201), the power source control unit 231 first checks the current setting state (S202), and if no power cap is set, ends the process. If the power cap A is set, the power source control unit 231 compares the inner power consumption Pt with a preset power cap A release threshold Pca (S203), and if the inner power consumption Pt is not less than the release threshold Pca, ends the process. In contrast, if the inner power consumption Pt is lower than the release threshold Pca, the power source control unit 231 releases the power cap A (S204) and ends the process.

In the state where the power cap B is set, the power source control unit 231 compares the inner power consumption Pt with a preset power cap B release threshold Pcb (S205), and if the inner power consumption Pt is not less than the release threshold Pcb, ends the process. In contrast, if the inner power consumption Pt is lower than the release threshold Pcb, the power source control unit 231 changes the power cap from the power cap B to the power cap A (S206), and then compares the inner power consumption Pt with the power cap A release threshold Pca (S207). If the inner power consumption Pt is not less than the power cap A release threshold Pca, the power source control unit 231 ends the process. However, if the inner power consumption Pt is lower than the power cap A release threshold Pca, the power source control unit 231 releases the power cap A (S208) and ends the process.

As described above, according to the present embodiment, in a state where the power source is only the power supply unit 221, when the inner power consumption Pt of the server 201 exceeds the threshold power Pb, the state transits to a state where the power source is the power supply unit 221 and the secondary battery 222. As such, as the power supply unit 221 is not necessary to cover the maximum value of the inner power consumption Pt solely by itself, it is possible to use a power supply unit which is smaller, less expensive, and having better conversion efficiency at the time of normal operation, as the power supply unit 120.

Further, according to the present embodiment, in a state where the power source is only the power supply unit 221, when the inner power consumption Pt of the server 201 exceeds the threshold power Pb, the remaining capacity of the secondary battery 222 is checked, and if the remaining capacity is insufficient, a power cap for low power consumption is set to the server 201. As such, it is possible to prevent a state where the inner power consumption Pt of the server 201 exceeds the maximum available power supply from the power supply unit 22 so that the operation of the server 201 becomes unstable.

Further, according to the present embodiment, as the inner power consumption Pt of the server 201 is estimated based on the operating state of the server components such as the CPU, lower cost and smaller space can be realized compared with the configuration of measuring the inner power consumption Pt using a wattmeter.

Further, according to the present embodiment, as the power cap A and the power cap B, which are different in the maximum power consumption, are used depending on whether the secondary battery 222 is chargeable or dischargeable, it is possible to fully utilize the maximum available power supply from the power supply unit 221 regardless of the secondary battery 222 is being charged or not.

Further, according to the present embodiment, as necessity of an assist by the secondary battery 222 is determined by comparing the inner power consumption Pt of the server 201 with an assist initiation threshold power Pt, it is possible to appropriately determine a point of time when the assist by the secondary battery 222 becomes unnecessary, compared with the configuration in which necessity of an assist by the secondary battery 222 is determined based on the received power energy, for example.

It should be noted that although the assist start threshold power Pb by the secondary battery is a fixed value in the present embodiment, the value may be a variable value which varies according to date and time, as in the third exemplary embodiment.

Further, although the present embodiment uses one power supply unit 221, a plurality of power supply units may be used. For example, the present invention may include a power supply unit for a server component such as the CPU, and a power supply unit for charging the secondary battery 222. In that case, only one type of power cap is required.

Further, in the present embodiment, it is also possible to control power usage in stages by performing power cap at a plurality of stages according to the level of remaining capacity of the secondary battery 222.

Further, although a server is exemplary used in the present embodiment, the present invention is applicable to another type of IT apparatus such as a storage device or a network apparatus.

Sixth Exemplary Embodiment

A sixth exemplary embodiment will be described. Although the sixth exemplary embodiment has the same basic configuration as that of the fifth exemplary embodiment, in this embodiment, the secondary battery 222 can be fully charged before the time period in which the power consumption of the server 201 reaches a peak.

Figure 13:
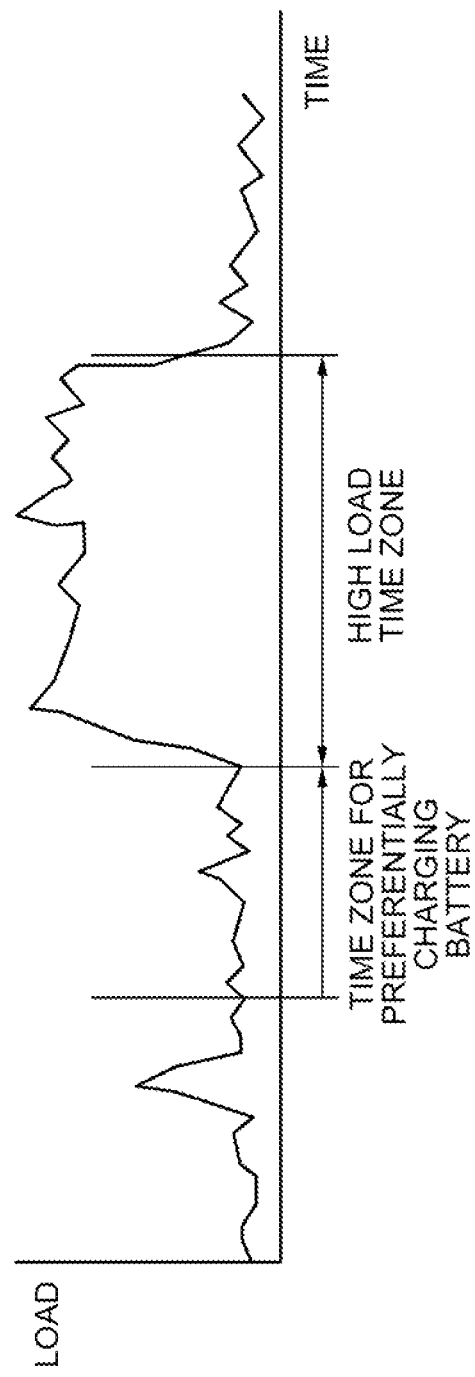
FIG. 13 is a graph showing exemplary transition of a load on a server in a sixth exemplary embodiment of the present invention.

FIG. 13 shows an exemplary average transition of load state of the server 201, based on a record of load information in a day. As shown in FIG. 13, in an IT apparatus, there is often a particular time period when the load increases depending on the usage, generally. In order to utilize an assist by the secondary battery 222 maximally in this high load time period, the present embodiment is configured to perform a control such that the secondary battery 222 is preferentially charged in the previous time period.

Figure 14:
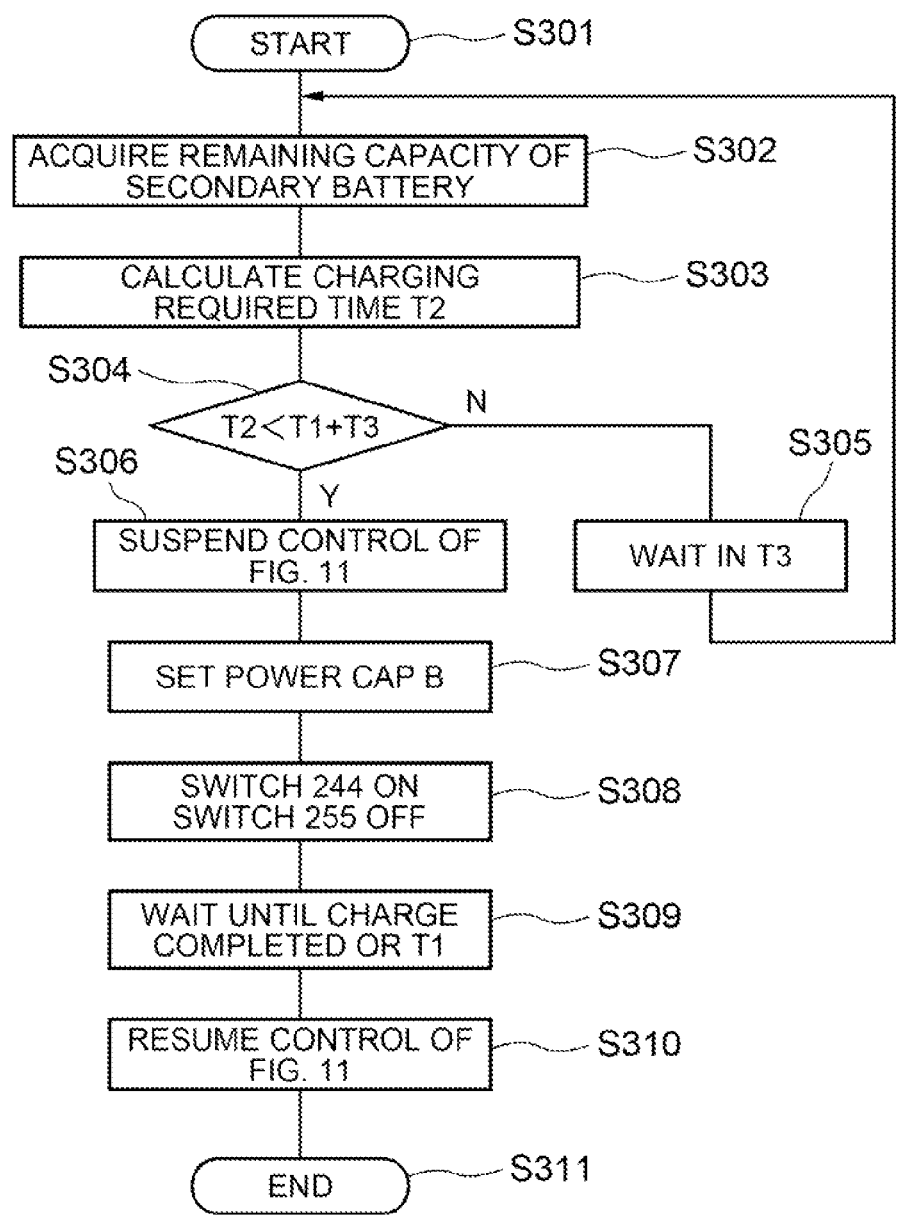
FIG. 14 is a flowchart showing an example of a charge scheduling process in the sixth exemplary embodiment of the present invention.

In the present embodiment, the power source control unit 231 refers to a current time and checks whether the remaining time T1 up to the start time of the high load time period is insufficient for fully charging the secondary battery 222 in a state where the remaining capacity is zero, and when the remaining time T1 is deficient, the power source control unit 231 performs a charging scheduling process shown in the flowchart of FIG. 14 in parallel with the process shown in FIG. 11.

When the power source control unit 231 starts the process shown in FIG. 14 (S301), the power source control unit 231 first checks the remaining capacity of the secondary battery 222 (S302), and estimates a charging time T2 required for fully charging the secondary battery 222 based on the remaining capacity (S303). At this time, the charging time T2 is estimated with a predetermined margin. Then, the power source control unit 231 compares the time T2 required for charging with a time which is the sum of a time T1 and a next determination execution interval T3 (S304). If the time T2 required for charging is longer, the power source control unit 231 waits for a certain time T3 (S305), and then repeats the process from step S302.

On the other hand, if the time T2 required for charging is the same as the time which is the sum of the time T1 and the next determination execution interval T3 or shorter, the power source control unit 231 suspends the control shown in FIG. 11 (S306), sets the power cap B to the server 201 (S307), and turns on the switch 224 and turns off the switch 225 (S308). Thereby, charging of the secondary battery 222 is started. Then, the power source control unit 231 waits until the charging is completed or the high load time period comes (S309). Then, when the charging has been completed or the high load time period has come, the power source control unit 231 resumes the suspended control (S310) shown in FIG. 11, and ends the process of FIG. 14 (S311).

If the load on the server 201 increases during a period from the time when the charging has been completed until the start time of the high load time period, as an assist by the secondary battery 222 may start and the remaining capacity may be decreased, it is acceptable to apply a power cap in a time other than the high load time period so as to prevent the secondary battery 222 from being used.

As described above, according to the present embodiment, the high load time period in which the load on the server 201 reaches a peak can come in a state where the secondary battery 222 being fully charged. As such, an assist by the secondary battery 222 can be maximally utilized, so that it is possible to prevent a state where power cap must be set in the high load time period.

Next, an exemplary configuration of the power source control unit 231 used in the fifth and sixth exemplary embodiments will be described.

Figure 15:
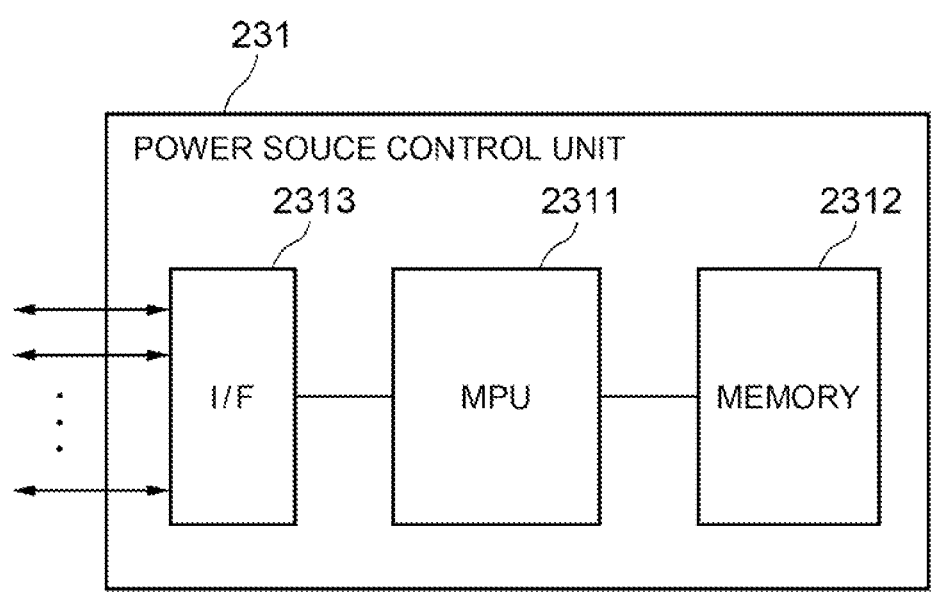
FIG. 15 is a block diagram showing an exemplary configuration of a power source control unit in the fifth and sixth exemplary embodiments of the present invention.

Referring to FIG. 15, the power source control unit 231 is configured of a controller 2311, a memory 2312, and an interface 2313. The memory 2312 is formed of a semiconductor memory or a magnetic disk, and stores various types of processing information such as the above-described power consumption estimation table and programs. The interface 2313 is used for outputting switching signals to the switches 223 to 225, and receiving load information from the server components such as the CPU 211. The controller 2311 is formed of a microprocessor. The controller 2311 executes programs stored in the memory 2312 so as to realize functions as the power source control unit 231 described in the fifth and sixth exemplary embodiments to perform the control shown in FIGS. 11, 12, and 14.

While the invention has been particularly shown and described with reference to exemplary embodiments thereof, the invention is no limited to these embodiments. It will be understood by those of ordinary skill in the art that various changes in form and details may be made therein without departing from the spirit and scope of the present invention as defined by the claims.

<Supplementary Notes>

The whole or part of the exemplary embodiments disclosed above can be described as, but not limited to, the following supplementary notes.

(Supplementary Note 1)

An electrical apparatus, comprising:
a main unit that consumes electrical power;
a power supply unit that supplies electrical power from a commercial power source to the main unit;
a secondary battery to be charged with electrical power supplied from the power supply unit; and
a power source control unit that, in a state where a power source of the main unit is the power supply unit, when power consumption of the main unit exceeds a first threshold, changes the state to another state where the power source of the main unit is the power supply unit and secondary battery.

(Supplementary Note 2)

The electrical apparatus, according to supplementary note 1, wherein
when the power consumption of the main unit exceeds the first threshold in the state where the power source of the main unit is the power supply unit, if remaining capacity of the secondary battery exceeds a second threshold, the power source control unit changes the state to the other state where the power source of the main unit is the power supply unit and the secondary battery, whereas if the remaining capacity of the secondary battery is not more than the second threshold, the power source control unit switches operation of the main unit to low power consuming operation in which power consumption is small.

(Supplementary Note 3)

The electrical apparatus, according to supplementary note 1 or 2, wherein
the power source control unit changes the first threshold according to date, time, and/or a day of the week.

(Supplementary Note 4)

The electrical apparatus, according to any of supplementary notes 1 to 3, wherein
in a case where the secondary battery is being charged with the electrical power from the power supply unit in a time period other than a time period in which the power consumption of the main unit becomes maximum, when the power consumption of the main unit exceeds a third threshold, the power source control unit switches operation of the main unit to low power consuming operation in which power consumption is small.

(Supplementary Note 5)

The electrical apparatus, according to any of supplementary notes 1 to 3, wherein
in a time period other than a time period in which power consumption of the main unit becomes maximum, the power source control unit switches operation of the main unit to low power consuming operation in which power consumption is small, and starts charging of the secondary battery with the electrical power from the power supply unit.

(Supplementary Note 6)

The electrical apparatus, according to any of supplementary notes 1 to 5, wherein
the power source control unit arranges a schedule such that charging of the secondary battery is completed by a start time of a time period in which power consumption of the main unit becomes maximum.

(Supplementary Note 7)

The electrical apparatus, according to any of supplementary notes 1 to 6, wherein
the power source control unit collects load information of a component constituting the main unit, and calculates power consumption of the main unit from the collected load information and a power consumption estimation table showing a relationship between the load information of the component and the power consumption.

(Supplementary Note 8)

An IT device, comprising:
a main component including a CPU that consumes electrical power, and a memory;
a power supply unit that supplies electrical power from a commercial power source to the main component;
a secondary battery to be charged with electrical power supplied from the power supply unit; and
a power source control unit that, in a state where a power source of the main component is the power supply unit, when power consumption of the main component exceeds a first threshold, changes the state to another state where the power source of the main component is the power supply unit and secondary battery.

(Supplementary Note 9)

The IT device, according to supplementary note 8, wherein
when power consumption of the main component exceeds the first threshold in the state where the power source of the main component is the power supply unit, if remaining capacity of the secondary battery exceeds a second threshold, the power source control unit changes the state to the other state where the power source of the main component is the power supply unit and the secondary battery, whereas if the remaining capacity of the secondary battery is not more than the second threshold, the power source control unit switches operation of the main component to low power consuming operation in which power consumption is small.

(Supplementary Note 10)

The IT device, according to supplementary note 8 or 9, wherein
the power source control unit changes the first threshold according to date, time, and/or a day of the week.

(Supplementary Note 11)
The IT device, according to any of supplementary notes 8 to 10, wherein
in a case where the secondary battery is being charged with the electrical power from the power supply unit in a time period other than a time period in which the power consumption of the main component becomes maximum, when the power consumption of the main component exceeds a third threshold, the power source control unit switches operation of the main component to low power consuming operation in which power consumption is small.

(Supplementary Note 12)
The IT device, according to any of supplementary notes 8 to 10, wherein
in a time period other than a time period in which power consumption of the main component becomes maximum, the power source control unit switches operation of the main component to low power consuming operation in which power consumption is small, and starts charging of the secondary battery with the electrical power from the power supply unit.

(Supplementary Note 13)
The IT device, according to any of supplementary notes 8 to 12, wherein
the power source control unit arranges a schedule such that charging of the secondary battery is completed by a start time of a time period in which power consumption of the main component becomes maximum.

(Supplementary Note 14)
The IT device, according to any of supplementary notes 8 to 13, wherein
the power source control unit collects load information of the main component, and calculates power consumption of the main component from the collected load information and a power consumption estimation table showing a relationship between the load information of the component and the power consumption.

(Supplementary Note 15)
A power source control device, comprising:
an interface that transmits a switching signal to a first switch which controls whether or not to supply electrical power from a power supply unit to a main unit, a second switch which controls whether or not to supply electrical power for charging from the power supply unit to a secondary battery, and a third switch which controls whether or not to supply electrical power from the secondary battery to the main unit; and
a control unit that, in a state where the first switch is on so that a power source of the main unit is the power supply unit, when power consumption of the main unit exceeds a first threshold, turns on the first switch and the third switch so as to change the state to another state where the power source of the main unit is the power supply unit and the secondary battery.

(Supplementary Note 16)
The power source control device, according to supplementary note 15, wherein
when the power consumption of the main unit exceeds the first threshold in the state where the power source of the main unit is the power supply unit, if remaining capacity of the secondary battery exceeds a second threshold, the control unit changes the state to the other state where the power source of the main unit is the power supply unit and the secondary battery, whereas if the remaining capacity of the secondary battery is not more than the second threshold, the power source control unit switches operation of the main unit to low power consuming operation in which power consumption is small.

(Supplementary Note 17)
The power source control device, according to supplementary note 15 or 16, wherein
the control unit changes the first threshold according to date, time, and/or a day of the week.

(Supplementary Note 18)
The power source control device, according to any of supplementary note 15 to 17, wherein
in a case where the second switch is turned on so that the secondary battery is being charged with the electrical power from the power supply unit in a time period other than a time period in which the power consumption of the main unit becomes maximum, when the power consumption of the main unit exceeds a third threshold, the control unit switches operation of the main unit to low power consuming operation in which power consumption is small.

(Supplementary Note 19)
The power source control device, according to any of supplementary notes 15 to 17, wherein
in a time period other than a time period in which power consumption of the main unit becomes maximum, the control unit switches operation of the main unit to low power consuming operation in which power consumption is small, and starts charging of the secondary battery with the electrical power from the power supply unit by turning on the second switch.

(Supplementary Note 20)
The power source control device, according to any of supplementary notes 15 to 19, wherein
the control unit arranges a schedule for charging such that charging of the secondary battery is completed by a start time of a time period in which power consumption of the main unit becomes maximum.

(Supplementary Note 21)
The power source control device, according to any of supplementary notes 15 to 20, wherein
the power source control unit collects load information of a component constituting the main unit, and calculates power consumption of the main unit from the collected load information and a power consumption estimation table showing a relationship between the load information of the component and the power consumption.

(Supplementary Note 22)
A power source controlling method performed by an electrical apparatus including a main unit that consumes electrical power, a power supply unit that supplies electrical power from a commercial power source to the main unit, and a secondary battery to be charged with electrical power supplied from the power supply unit, the method comprising:
in a state where a power source of the main unit is the power supply unit, when power consumption of the main unit exceeds a first threshold, changing the state to another state where the power source of the main unit is the power supply unit and secondary battery.

(Supplementary Note 23)
The power source controlling method, according to supplementary note 22, further comprising,
when the power consumption of the main unit exceeds the first threshold in the state where the power source of the main unit is the power supply unit, if remaining capacity of the secondary battery exceeds a second threshold, changing the state to the other state where the power source of the main unit is the power supply unit and the secondary battery, whereas if the remaining capacity of the secondary battery is not more than the second threshold, switching operation of the main unit to low power consuming operation in which power consumption is small.

(Supplementary Note 24)

The power source controlling method, according to supplementary note 22 or 23, further comprising, changing the first threshold according to date, time, and/or a day of the week.

(Supplementary Note 25)

The power source controlling method, according to any of supplementary notes 22 to 24, further comprising, in a case where the secondary battery is being charged with the electrical power from the power supply unit in a time period other than a time period in which the power consumption of the main unit becomes maximum, when the power consumption of the main unit exceeds a third threshold, switching operation of the main unit to low power consuming operation in which power consumption is small.

(Supplementary Note 26)

The power source controlling method, according to any of supplementary notes 22 to 24, further comprising, in a time period other than a time period in which power consumption of the main unit becomes maximum, switching operation of the main unit to low power consuming operation in which power consumption is small, and starting charging of the secondary battery with the electrical power from the power supply unit.

(Supplementary Note 27)

The power source controlling method, according to any of supplementary notes 22 to 26, further comprising, arranging a schedule such that charging of the secondary battery is completed by a start time of a time period in which power consumption of the main unit becomes maximum.

(Supplementary Note 28)

The power source controlling method, according to any of supplementary notes 22 to 27, further comprising, collecting load information of a component constituting the main unit, and calculating power consumption of the main unit from the collected load information and a power consumption estimation table showing a relationship between the load information of the component and the power consumption.

(Supplementary Note 29)

A computer program product comprising computer implementable instructions to cause a computer to function as, the computer including an interface for transmitting a switching signal to a first switch connected to a power supply channel from a power supply unit to a main unit, a second switch connected to a charging power supply channel from the power supply unit to a secondary battery, and a third switch connected to a power supply channel from the secondary battery to the main unit, a control unit that, in a state where the first switch is on so that a power source of the main unit is the power supply unit, when power consumption of the main unit exceeds a first threshold, turns on the first switch and the third switch so as to change the state to another state where the power source of the main unit is the power supply unit and the secondary battery.

(Supplementary Note 30)

The program, according to supplementary note 29, wherein when the power consumption of the main unit exceeds the first threshold in the state where the power source of the main unit is the power supply unit, if remaining capacity of the secondary battery exceeds a second threshold, the control unit changes the state to the other state where the power source of the main unit is the power supply unit and the secondary battery, whereas if the remaining capacity of the secondary battery is not more than the second threshold, the power source control unit switches operation of the main unit to low power consuming operation in which power consumption is small.

(Supplementary Note 31)

The program, according to supplementary note 29 or 30, wherein the control unit changes the first threshold according to date and time.

(Supplementary Note 32)

The program, according to any of supplementary notes 29 to 31, wherein in a case where the second switch is turned on so that the secondary battery is being charged with the electrical power from the power supply unit in a time period other than a time period in which the power consumption of the main unit becomes maximum, when the power consumption of the main unit exceeds a third threshold, the control unit switches operation of the main unit to low power consuming operation in which power consumption is small.

(Supplementary not 33)

The program, according to any of supplementary notes 29 to 31, wherein in a time period other than a time period in which power consumption of the main unit becomes maximum, the control unit switches operation of the main unit to low power consuming operation in which power consumption is small, and starts charging of the secondary battery with the electrical power from the power supply unit by turning on the second switch.

(Supplementary Note 34)

The program, according to any of supplementary notes 29 to 33, wherein the control unit arranges a schedule for charging such that charging of the secondary battery is completed by a start time of a time period in which power consumption of the main unit becomes maximum.

(Supplementary Note 35)

The program, according to any of supplementary notes 29 to 34, wherein the power source control unit collects load information of a component constituting the main unit, and calculates power consumption of the main unit from the collected load information and a power consumption estimation table showing a relationship between the load information of the component and the power consumption.

The invention claimed is:

1. A server device, comprising:
a server component including a CPU that consumes electrical power, a memory and a hard disk;
a power supply unit that supplies electrical power from a commercial power source to the server component;
a secondary battery to be charged with electrical power supplied from the power supply unit;
a first switch connected to a power supply channel from the power supply unit to the server component;
a second switch connected to a charging power supply channel from the power supply unit to the secondary battery;
a third switch connected to a power supply channel from the secondary battery to the server component;
a power source control device connected to the server component, the power supply unit, the secondary battery, the first switch, the second switch and the third switch, and
wherein the power source control device which,
in a state where the first switch is on and the third switch is off, when power consumption of the server component exceeds a first threshold, if remaining capacity of the secondary battery exceeds a second threshold, turns on the third switch;

whereas if the remaining capacity of the secondary battery is not more than the second threshold, in a case of charging the secondary battery is not performed, switches operation of the power supply unit to a first low power consuming operation in which a maximum power consumption of the server component is not more than a maximum available power supply of the power supply unit and turns off the second switch, and whereas in a case of charging the secondary battery is performed, switches operation of the power supply unit to a second low power consuming operation in which a maximum power consumption of the server component is not more than a value obtained by deducting a predetermined amount of power for charging the secondary battery from the maximum available power supply of the power supply unit, and turns on the second switch.

2. The server device according to claim 1, wherein the power source control device which, in a state where both the first and the third switches are on, when the power consumption of the server component is not more than the first threshold, turns off the third switch, when the power consumption of the server component stays exceeding the first threshold, if remaining capacity of the secondary battery is not more than the second threshold, switches operation of the server component to the first low power consuming operation and turned off the third switch, and in the case of charging the secondary battery is not performed, turns off the second switch whereas in the case of charging the secondary battery is performed, switches operation of the power supply unit to a second low power consuming operation and turns on the second switch.

3. The server device according to claim 2, wherein the power source control device which, in a state where the first switch is on and the third switch is off, when power consumption of the server component is not more than the first threshold, in the case of charging the secondary battery is not performed, turns off the second switch and performs a predetermined operation whereas in the case of charging the secondary battery is performed, turns on the second switch and performs the predetermined operation, and in the predetermined operation, the power source control device which, determines whether the server component is in the state of the first low power consuming operation or in the state of the second low power consuming operation;

if the server component is in the first low power consuming operation, in a case of amount of the power consumption of the server component is smaller than the third threshold, switches the server component to a normal operation without limit of power consumption, and if the server component is in the second low power consuming operation, in a case of amount of the power consumption of the server component is smaller than a fourth threshold being larger than the third threshold, switches the server component to the first low power consuming operation and determines whether or not power consumption of the server component is smaller than the third threshold, and if the power consumption of the server component is smaller than the third threshold, switches the server component to the normal operation.

4. A power source control device, connecting with:

a server component including a CPU that consumes electrical power, a memory and a hard disk;

a power supply unit that supplies electrical power from a commercial power source to the server component;

a secondary battery to be charged with electrical power supplied from the power supply unit;

a first switch connected to a power supply channel from the power supply unit to the server component;

a second switch connected to a charging power supply channel from the power supply unit to the secondary battery; and a third switch connected to a power supply channel from the secondary battery to the server component wherein the power source control device has an interface for transmitting a switching signal to the first switch, the second switch, the third switch and a control unit connected with the interface, and wherein the control unit which, in a state where the first switch is on and the third switch is off, when power consumption of the server component exceeds a first threshold, if remaining capacity of the secondary battery exceeds a second threshold, turns on the third switch;

whereas if the remaining capacity of the secondary battery is not more than the second threshold, in a case of charging the secondary battery is not performed, switches operation of the power supply unit to a first low power consuming operation in which a maximum power consumption of the server component is not more than a maximum available power supply of the power supply unit and turns off the second switch, and whereas in a case of charging the secondary battery is performed, switches operation of the power supply unit to a second low power consuming operation in which a maximum power consumption of the server component is not more than a value obtained by deducting a predetermined amount of power for charging the secondary battery from the maximum available power supply of the power supply unit, and turns on the second switch.

5. The power source control device according to claim 4 is which, in a state where both the first and the third switches are on, when the power consumption of the server component is not more than the first threshold, turns off the third switch, when the power consumption of the server component stays exceeding the first threshold, if remaining capacity of the secondary battery is not more than the second threshold, switches operation of the server component to the first low power consuming operation and turned off the third switch, and in the case of charging the secondary battery is not performed, turns off the second switch whereas in the case of charging the secondary battery is performed, switches operation of the power supply unit to a second low power consuming operation and turns on the second switch.

6. The power source control device according to claim 5 which, in a state where the first switch is on and the third switch is off, when power consumption of the server component is not more than a first threshold, in the case of charging the secondary battery is not performed, turns off the second switch and performs a predetermined operation whereas in the case of charging the secondary battery is performed, turns on the second switch and performs the predetermined operation, and in the predetermined operation, the power source control device which, determines whether the server component is in the state of the first low power consuming operation or in the state of the second low power consuming operation;

if the server component is in the first low power consuming operation, in the case of amount of the power consumption of the server component is smaller than the third threshold, switches the server component to the normal operation without limit of power consumption, and if the server component is in the second low power consuming operation, in the case of amount of the power consumption of the server component is smaller than a fourth threshold being larger than the third threshold, switches the server component to the first low power consuming operation and determines whether or not power consumption of the server component is smaller than the third threshold, and if the power consumption of the server component is smaller than the third threshold, switches the server component to the normal operation.

7. A power source controlling method performed by a server device having a server component including a CPU that consumes electrical power, a memory and a hard disk;

a power supply unit that supplies electrical power from a commercial power source to the server component;

a secondary battery to be charged with electrical power supplied from the power supply unit;

a first switch connected to a power supply channel from the power supply unit to the server component;

a second switch connected to a charging power supply channel from the power supply unit to the secondary battery;

a third switch connected to a power supply channel from the secondary battery to the server component; and a power source control device connected to the server component, the power supply unit, the secondary battery, the first switch, the second switch and the third switch, and wherein the power source controlling method comprises, in a state where the first switch is on and the third switch is off, when power consumption of the server component exceeds a first threshold, if remaining capacity of the secondary battery exceeds a second threshold, turning on the third switch;

whereas if the remaining capacity of the secondary battery is not more than the second threshold, in a case of charging the secondary battery is not performed, switching operation of the power supply unit to a first low power consuming operation in which a maximum power consumption of the server component is not more than a maximum available power supply of the power supply unit and turning off the second switch, and whereas in a case of charging the secondary battery is performed, switching operation of the power supply unit to a second low power consuming operation in which a maximum power consumption of the server component is not more than a value obtained by deducting a predetermined amount of power for charging the secondary battery from the maximum available power supply of the power supply unit, and turning on the second switch.

8. The power source controlling method according to claim 7, further comprising, in a state where both the first and the third switches are on, when the power consumption of the server component is not more than the first threshold, turning off the third switch, when the power consumption of the server component stays exceeding the first threshold, if remaining capacity of the secondary battery is not more than the second threshold, switching operation of the server component to the first low power consuming operation and turning off the third switch, and in the case of charging the secondary battery is not performed, turning off the second switch whereas in the case of charging the secondary battery is performed, switching operation of the power supply unit to the second low power consuming operation and turning on the second switch.

9. The power source controlling method according to claim 8, further comprising, in a state where the first switch is on and the third switch is off, when power consumption of the server component is not more than a first threshold, in the case of charging the secondary battery is not performed, turning off the second switch and performing a predetermined operation whereas in the case of charging the secondary battery is performed, turning on the second switch and performing the predetermined operation, and in the predetermined operation, the power source control device which, determines whether the server component is in the state of the first low power consuming operation or in the state of the second low power consuming operation;

if the server component is in the first low power consuming operation, in the case of amount of the power consumption of the server component is smaller than the third threshold, switching the server component to a normal operation without limit of power consumption, and if the server component is in the second low power consuming operation, in the case of amount of the power consumption of the server component is smaller than a fourth threshold being larger than the third threshold, switching the server component to the first low power consuming operation and determines whether or not power consumption of the server component is smaller than the third threshold, and if the power consumption of the server component is smaller than the third threshold, switching the server component to the normal operation.

10. A non-transitory computer-readable data storage medium storing a computer program comprising instructions that when executed cause a server device to a perform a power source controlling method, the server device having a power control device including a CPU that consumes electrical power, a memory and a hard disk;

a power supply unit that supplies electrical power from a commercial power source to the server component;

a secondary battery to be charged with electrical power supplied from the power supply unit;

a first switch connected to a power supply channel from the power supply unit to the server component;

a second switch connected to a charging power supply channel from the power supply unit to the secondary battery;

a third switch connected to a power supply channel from the secondary battery to the server component; and a power source control device connected to the server component, the power supply unit, the secondary battery, the first switch, the second switch and the third switch, and wherein the power source controlling method comprises, in a state where the first switch is on and the third switch is off, when power consumption of the server component exceeds a first threshold, if remaining capacity of the secondary battery exceeds a second threshold, turns on the third switch;

whereas if the remaining capacity of the secondary battery is not more than the second threshold, in a case of charging the secondary battery is not performed, switches operation of the power supply unit to a first low power consuming operation in which a maximum power consumption of the server component is not more than a maximum available power supply of the power supply unit and turns off the second switch, and whereas in a case of charging the secondary battery is performed, switches operation of the power supply unit to a second low power consuming operation in which a maximum power consumption of the server component is not more than a value obtained by deducting a predetermined amount of power for charging the secondary battery from the maximum available power supply of the power supply unit, and turns on the second switch.

11. The non-transitory computer-readable data storage medium according to claim 10, wherein when the power source control device in a state where both the first and the third switches are on, when the power consumption of the server component is not more than the first threshold, turns off the third switch, when the power consumption of the server component stays exceeding the first threshold, if remaining capacity of the secondary battery is not more than the second threshold, switches operation of the server component to the first low power consuming operation and turned off the third switch, and in the case of charging the secondary battery is not performed, turns off the second switch whereas in the case of charging the secondary battery is performed, the power source control device switches operation of the power supply unit to the second low power consuming operation and turns on the second switch.

12. The non-transitory computer-readable data storage medium according to claim 11 wherein when the power source control device in a state where the first switch is on and the third switch is off, when power consumption of the server component is not more than a first threshold, in the case of charging the secondary battery is not performed, turns off the second switch and performs a predetermined operation, whereas in the case of charging the secondary battery is performed, turns on the second switch and performs the predetermined operation, and in the predetermined operation, the power source control device determines whether the server component is in the state of the first low power consuming operation or in the state of the second low power consuming operation;

if the server component is in the first low power consuming operation, in the case of amount of the power consumption of the server component is smaller than the third threshold, switches the server component to a normal operation without limit of power consumption, and if the server component is in the second low power consuming operation, in the case of amount of the power consumption of the server component is smaller than a fourth threshold being larger than the third threshold, switches the server component to the first low power consuming operation and determines whether or not power consumption of the server component is smaller than the third threshold, and if the power consumption of the server component is smaller than the third threshold, switches the server component to the normal operation.

* * * * *